(12) United States Patent
Singh et al.

(10) Patent No.: US 11,566,575 B2
(45) Date of Patent: Jan. 31, 2023

(54) SUB-RESOLUTION MEASUREMENT OF FUEL IN FUEL TANK

(71) Applicant: INTANGLES LAB PVT. LTD., Pune (IN)

(72) Inventors: Aman Singh, Pune (IN); Pushkar Nimkar, Thane (IN); Tushar Kashyape, Akola (IN); Neil Unadkat, Pune (IN); Anup Patil, Pune (IN); Jayshri Abhijit Patil, Bengaluru (IN); Shweta Mandhare, Pune (IN)

(73) Assignee: INTANGLES LAB PVT. LTD., Pune, IN (US)

( * ) Notice: Subject to any disclaimer, the term of this patent is extended or adjusted under 35 U.S.C. 154(b) by 0 days.

(21) Appl. No.: 17/334,652

(22) Filed: May 28, 2021

(65) Prior Publication Data

US 2022/0298985 A1 Sep. 22, 2022

(30) Foreign Application Priority Data

Mar. 19, 2021 (IN) ............................. 202121011767

(51) Int. Cl.
 *F02D 41/14* (2006.01)
 *F02D 41/26* (2006.01)
 (Continued)

(52) U.S. Cl.
 CPC .......... *F02D 41/1401* (2013.01); *B60R 25/32* (2013.01); *F02D 41/26* (2013.01);
 (Continued)

(58) Field of Classification Search
 CPC ................ F02D 41/1401; F02D 41/26; F02D 2041/1409; F02D 2041/1432;
 (Continued)

(56) References Cited

U.S. PATENT DOCUMENTS

| 4,218,744 A | * | 8/1980 | Pratt | ...................... G01F 9/001 701/99 |
| 4,400,779 A | * | 8/1983 | Kosuge | ................... G01F 9/023 701/123 |

(Continued)

FOREIGN PATENT DOCUMENTS

EP 2466278 B1 1/2015

OTHER PUBLICATIONS

Zhao et al., Real-Time Prediction of Fuel Consumption Based on Digital Map API, Apr. 1, 2019, Appl. Sci. 2019, 9, 1369, pp. 1-13.
(Continued)

*Primary Examiner* — Carl C Staubach
(74) *Attorney, Agent, or Firm* — Procopio, Cory, Hargreaves & Savitch LLP

(57) ABSTRACT

Sub-resolution measurement of fuel in fuel tank. In an embodiment, data, which comprise discrete fuel levels in a fuel tank and fuel injection rates for an internal combustion engine, are received. The fuel injection rates are integrated over a traversed distance to produce a fuel consumption series, and the discrete fuel levels are clustered over the traversed distance to produce a fuel level series. The fuel consumption and fuel level series are synchronized into a model that is used to generate sub-resolution measurements of fuel levels between the discrete fuel levels.

22 Claims, 12 Drawing Sheets

(51) Int. Cl.
  *B60R 25/32* (2013.01)
  *G01F 23/80* (2022.01)
(52) U.S. Cl.
  CPC .... *G01F 23/804* (2022.01); *F02D 2041/1409* (2013.01); *F02D 2041/1432* (2013.01); *F02D 2041/1433* (2013.01); *F02D 2200/0625* (2013.01); *F02D 2200/701* (2013.01)
(58) Field of Classification Search
  CPC ..... F02D 2041/1433; F02D 2200/0625; F02D 2200/701; B60R 25/32; G01F 23/804
  See application file for complete search history.

(56) References Cited

U.S. PATENT DOCUMENTS

| | | | | |
|---|---|---|---|---|
| 6,510,842 | B2* | 1/2003 | Ismailov | F02M 65/00 356/28.5 |
| 6,666,084 | B2* | 12/2003 | Schelhas | G01F 9/008 73/290 R |
| 7,054,760 | B2* | 5/2006 | Youngquist | G01F 25/10 702/50 |
| 8,733,167 | B2* | 5/2014 | Windbergs | G01F 23/804 73/1.73 |
| 10,030,816 | B2* | 7/2018 | Handa | F17C 13/028 |
| 10,940,753 | B2* | 3/2021 | Thomas | G01F 23/30 |
| 11,274,622 | B1* | 3/2022 | Dudar | B60K 15/00 |
| 2010/0185360 | A1 | 7/2010 | Windbergs et al. | |
| 2011/0172895 | A1* | 7/2011 | Fukumoto | F02D 41/2422 701/103 |
| 2014/0244110 | A1* | 8/2014 | Tharaldson | G01C 21/3691 701/99 |
| 2016/0136747 | A1* | 5/2016 | Trinkner | B23K 9/173 219/133 |
| 2017/0038238 | A1* | 2/2017 | Nguyen | G01F 9/00 |

OTHER PUBLICATIONS

Eskilsson et al., Fuel Level Estimation Methods, Dec. 31, 2018 (Dec. 31, 2018) URL: https://odr.chalmers.se/bitstream/20.500.12380/255524/1/255524.pdf; Sections 2 1.3.1 and 3, 67 pages.
International Search Report and Written Opinion for PCT/IN2022/050274 dated Jul. 15, 2022, 11 pages.

* cited by examiner

FIG. 9A
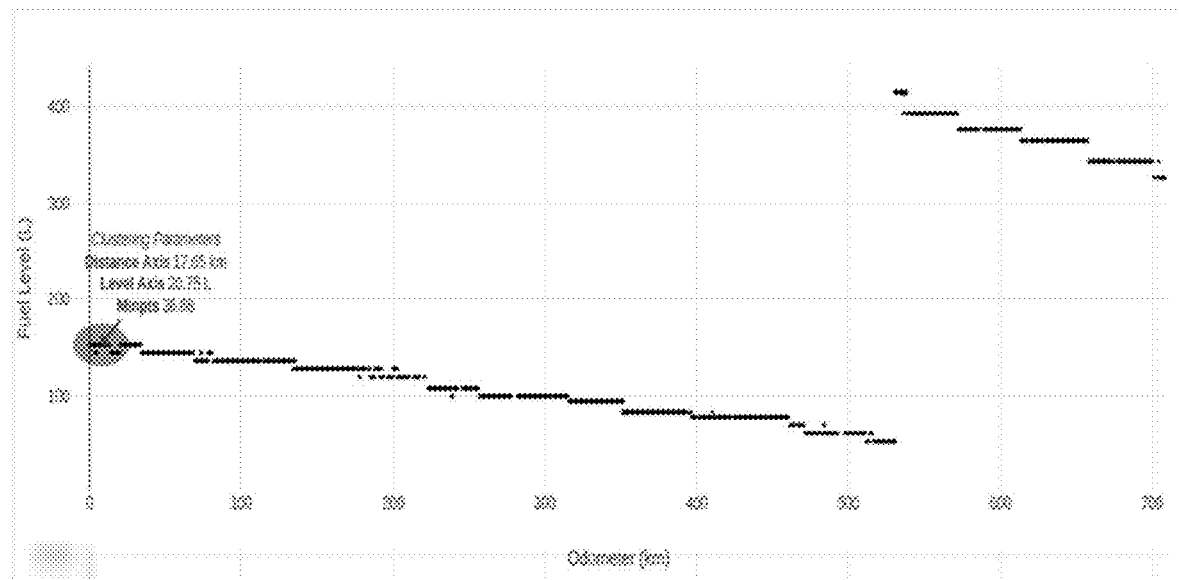
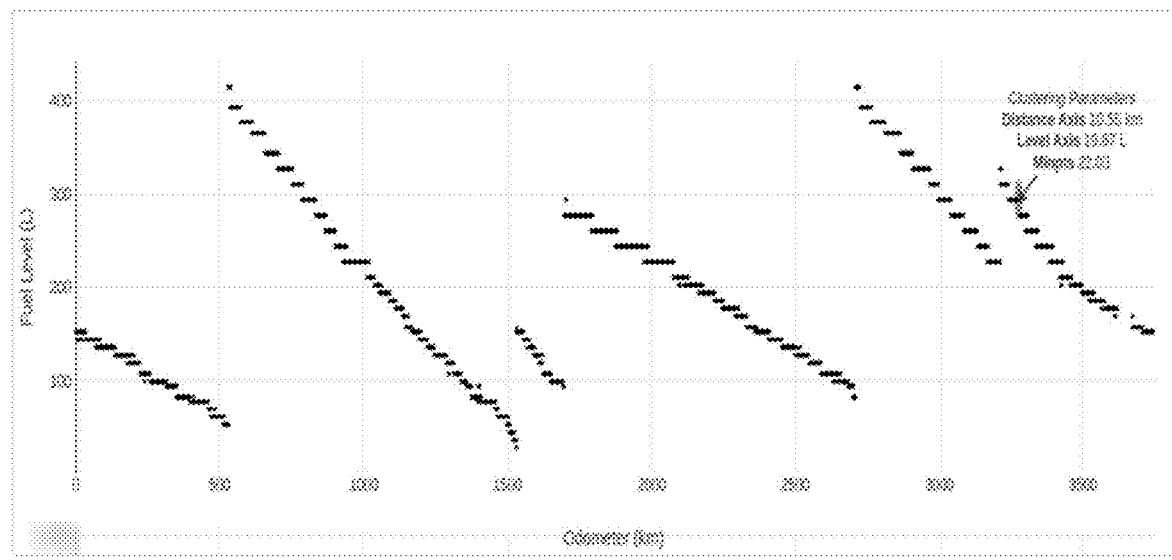
FIG. 9B

SUB-RESOLUTION MEASUREMENT OF FUEL IN FUEL TANK

CROSS-REFERENCE TO RELATED APPLICATIONS

The present application claims priority to Indian Patent App. No. 202121011767, filed on Mar. 19, 2021, which is hereby incorporated herein by reference as if set forth in full.

BACKGROUND

Field of the Invention

The embodiments described herein are generally directed to measuring fuel, and, more particularly, to measuring the fuel level in a fuel tank, which supplies an internal combustion engine (e.g., within a vehicle or generator), at a higher resolution than the existing fuel-level sensor (i.e., at sub-resolution between discrete fuel levels).

Description of the Related Art

The fuel-level sensors installed in modern vehicles (e.g., trucks, cars, construction vehicles, etc.) and generators have limited precision. For example, electromagnetic sensors are commonly used to measure fuel levels in the fuel tanks of commercial vehicles and generators. Typically, a vertical array of electromagnetic sensors (e.g., twenty to twenty-five sensors) is integrated into the fuel tank. An example of such a sensing system 100 is illustrated in FIG. 1. Sensors 110 in the array are spaced at non-equidistant intervals, with smaller intervals near the bottom of the fuel tank to support higher precision in distance-to-empty measurements as the fuel level decreases. Typically, the volume of fuel that can fit between two adjacent sensors 110 varies from ten liters (e.g., near the bottom of the fuel tank) to forty liters (e.g., near the top of the fuel tank).

There are also dead-bands (i.e., volumes of fuel that cannot be measured because they are not between a pair of sensors 110) above the top-most sensor and below the bottom-most sensor. FIG. 2 illustrates these dead-bands at the top and bottom of the fuel tank. The top dead-band includes deadstock in the region that extends from the top-most switch (i.e., representing full capacity) to the neck of the fuel tank. The volume in this top dead-band is a dynamic unknown, since it is a function of when the fluid levels out with the orifice of the fuel tank or when the fuel-filling nozzle cuts off during a refill event. In addition, this volume can change based on the vehicle's orientation, vapor pressure inside the fuel tank, the nozzle angle at the orifice, and the like. The bottom dead-band includes deadstock in the region below the bottom-most switch at the base of the fuel tank.

As a result of the sparse arrangement of sensors 110 in the fuel tank and distortions in the effective fuel volumes due to environmental conditions, modern fuel-level sensors have limited precision. This can be especially problematic in heavy commercial vehicles (HCVs), which are typically equipped with 100-120 gallon (~380-450 liter) fuel tanks. Sensing system 100 is just one example of a vendor-specific configuration that is prevalent in low-resource settings. It should be understood that sensing systems may have many variations across different original equipment manufacturers (OEMs) and even within models from the same OEM. In all cases, the measurement of fuel at discrete levels, while inexpensive, is prone to inaccuracy.

The use of reed switches is one example of measuring fuel level using electromagnetic sensors. In such a system, a ring magnet is mounted on a float inside the fuel tank. The float moves vertically along a non-magnetic (e.g., plastic) tube as the fuel level rises and falls. Magnetic reed switches are mounted and sealed in the tube at discrete levels. As the float moves vertically, it passes the reed switches. When the ring magnet on the float approaches a particular reed switch, it closes that reed switch. Notably, since the tube is non-ferrous, the tube does not impede the magnetic field. Thus, the reed switch operates whenever the field intensity between the reed switch and ring magnet reaches a threshold level, and is protected from the fluid being monitored by virtue of being sealed in the tube.

Discrete voltage levels, corresponding to the closure of each reed switch, are measured using a resistor ladder network. The resistor ladder network is a potentiometric apparatus that can be extended to any number of levels within the resolution of the analog-to-digital converter that is being used. Thus, the fuel level in deep fuel tanks can be measured with many discrete levels. Variable switch-spacing schemes can also be devised to suit tanks with spherical cross-sections or other shaped cross-sections. Raw voltage readings from the potentiometric apparatus are passed through smoothing filters and mapped to fixed fuel tank volume percentages, using calibration curves that are stored in the engine management system (EMS) (e.g., for display by the instrument cluster unit (ICU)). These percentages may be sampled via the on-board diagnostics (OBD) interface of the vehicle.

These highly discrete fuel level percentages have significant proportions of unmeasured fuel volume between them. The inability to measure the fuel volume between the discrete sensors impedes accurate estimations of fuel consumption, refill amounts, and fuel theft. In addition, the resulting inaccurate estimations of remaining fuel volume can hinder predictions of cruise range.

While some solutions have been developed for more accurately measuring fuel levels, these solutions are either not cost-effective or not sufficiently robust to withstand the rigors of environmental conditions. For example, capacitive sensors represent an improvement to the discrete levels of electromagnetic switches. Specifically, capacitive sensors can be calibrated to a continuous curve, thereby resolving the problem of discrete-level resolution. However, capacitive sensors are generally not cost-effective for OEMs, and after-market installation is tedious. Specifically, the fuel tank must be dismounted and drained, the fuel tank must be drilled for installation of the capacitive element, which is hazardous and may void OEM warranties on the fuel tank, and during commissioning, the capacitive sensor must be calibrated by filling the fuel tank from a completely drained state by 2-3% of tank capacity at a time, which is time-consuming.

Furthermore, both switch-based and capacitive sensors are susceptible to corrosion over time, which can alter the voltage-to-volume mapping in the calibration curves. These sensors are also impacted by the sloshing of fuel inside the fuel tank, which can result in sudden impulses in measurement values. These impulses are especially problematic in off-highway machinery, such as tipper trucks and construction equipment. While de-bouncing strategies can mitigate some sloshing-induced impulses, they are currently inadequate.

SUMMARY

Accordingly, systems, methods, and non-transitory computer-readable media are disclosed to more accurately estimate fuel levels by providing sub-resolution measurements (i.e., measurements of fuel levels between discrete sensor levels). Advantageously, these sub-resolution measurements can address issues in estimating fuel consumption, refill amounts, and pilferage amounts (e.g., from fuel theft). In addition, disclosed embodiments do not require the replacement of existing sensing systems or the installation of expensive sensing systems.

In an embodiment, a method is disclosed that comprises using at least one hardware processor to: receive data comprising discrete fuel levels in a fuel tank supplying an internal combustion engine, and fuel injection rates for the internal combustion engine; integrate the fuel injection rates over a traversed distance to produce a fuel consumption series; cluster the discrete fuel levels into clusters over the traversed distance to produce a fuel level series; synchronize the fuel consumption series and the fuel level series into a model by mapping sub-ranges of the fuel consumption series to corresponding bins in the fuel level series; and generate sub-resolution measurements of fuel levels, between the discrete fuel levels, based on the model.

The method may further comprise using the at least one hardware processor to: calculate dispersion characteristics in the fuel level series according to one or more clustering parameters; and detect one or more refill events based on the dispersion characteristics. The method may further comprise using the at least one hardware processor to update the one or more clustering parameters over time. The one or more clustering parameters may comprise a fuel level scale representing a semi-minor axis of an ellipse used to cluster fuel level values, a distance scale representing a semi-major axis of the ellipse, and a minimum number of points. The method may further comprise using the at least one hardware processor to detect one or more pilferage events based on the dispersion characteristics. The method may further comprise using the at least one hardware processor to, in response to detecting a pilferage event, generate an alert. The dispersion characteristics may be calculated using a sliding window, wherein a size of the sliding window is adjusted over time as new data is received.

Detecting one or more refill events may comprise differentiating between a tank-top refill event and a partial refill event. The method may further comprise using the at least one hardware processor to, in response to detecting a first tank-top refill event, generate an estimator map that estimates fuel level as a function of the fuel consumption series.

Synchronizing the fuel consumption series and the fuel level series may comprise: when the estimator map has not yet been generated, calculating an offset based on fuel levels in the received data; when the estimator map has been generated, calculating the offset based on the estimator map; and aligning the sub-ranges of the fuel consumption series with the bins in the fuel level series based on the offset.

The method may further comprise using the at least one hardware processor to, in response to detecting each refill event after the first tank-top refill event, update the estimator map.

The method may further comprise using the at least one hardware processor to, before integrating the fuel injection rates over the traversed distance to produce the fuel consumption series: analyze a probability distribution of the fuel injection rates to determine whether or not bias exists at one or more extremities of the fuel injection rates; and, when determining that bias exists at an extremity of the fuel injection rates, apply a filter to the fuel injection rates at the extremity.

The clustering may comprise unsupervised density-based clustering.

Clustering the discrete fuel levels into clusters over the traversed distance to produce the fuel level series may comprise processing each cluster using non-parametric regression to eliminate sloshing-induced dispersions.

The clustering may utilize a plurality of parameters that are updated over time as new data is received, wherein the plurality of parameters comprises a level scale representing a first axis of an ellipse used for clustering in a function of fuel level to distance or engine hours, a distance scale representing a second axis of the ellipse, and a minimum number of points for a cluster.

The received data may further comprise two or more odometer values, wherein the method further comprises using the at least one hardware processor to calculate the traversed distance based on the two or more odometer values. Alternatively or additionally, the received data may further comprise two or more geospatial coordinates, wherein the method further comprises using the at least one hardware processor to calculate the traversed distance based on the two or more geospatial coordinates.

The data may be received from a telematics control unit, installed in a vehicle comprising the fuel tank and the internal combustion engine, over at least one network. The at least one network may comprise a wireless network. The data may be received in real time.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 9A and 9B illustrate an example of how clustering parameters are updated, according to an embodiment;

DETAILED DESCRIPTION

In an embodiment, systems, methods, and non-transitory computer-readable media are disclosed for sub-resolution measurement of fuel levels. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 3:
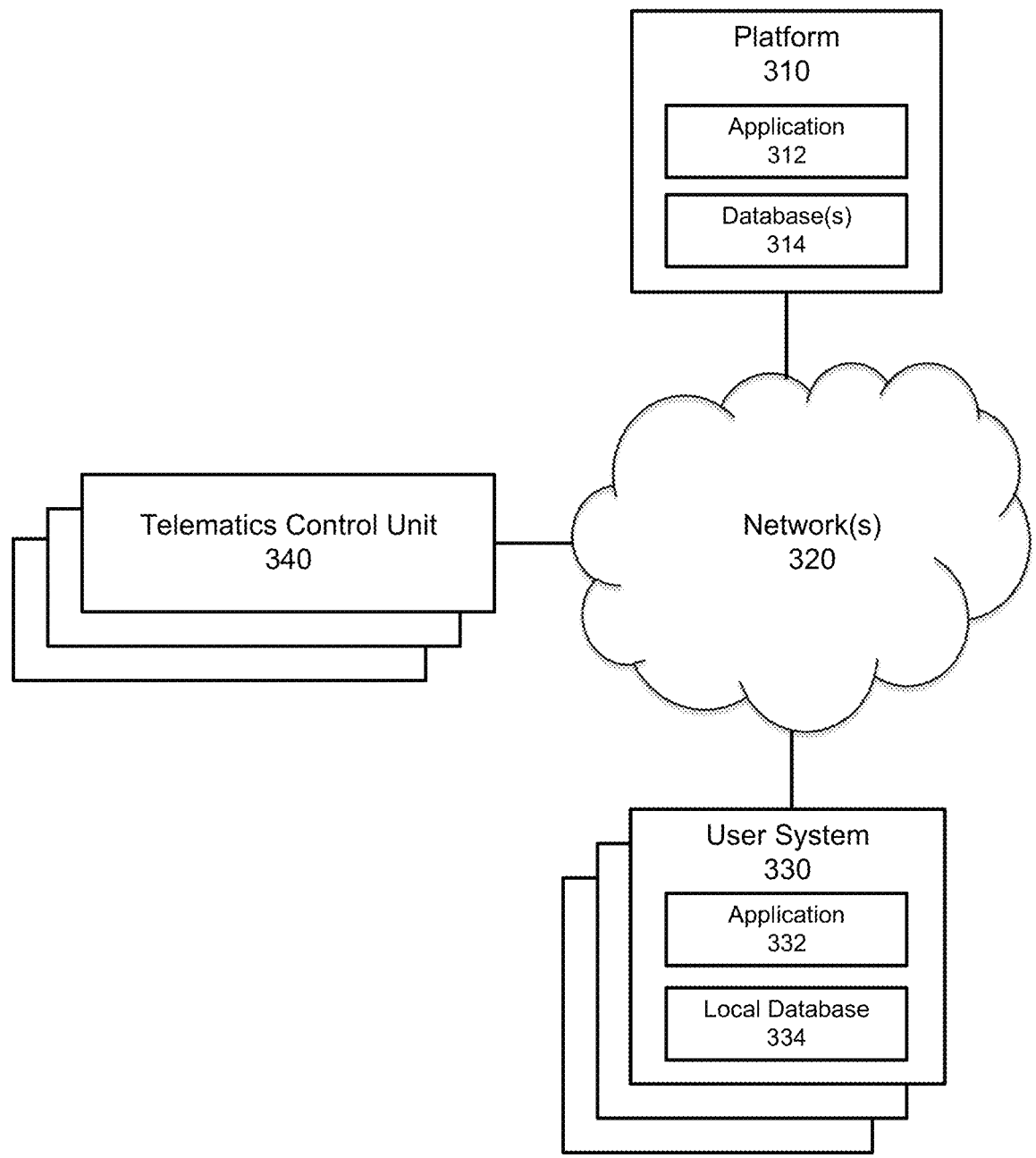
FIG. 3 illustrates an example infrastructure, in which one or more of the processes described herein, may be implemented, according to an embodiment.

FIG. 3 illustrates an example infrastructure in which one or more of the disclosed processes may be implemented, according to an embodiment. The infrastructure may comprise a platform 310 (e.g., one or more servers) which hosts and/or executes one or more of the various functions, processes, methods, and/or software modules described herein. Platform 310 may comprise dedicated servers, or may instead comprise cloud instances, which utilize shared resources of one or more servers. These servers or cloud instances may be collocated and/or geographically distributed. Platform 310 may also comprise or be communicatively connected to a server application 312 and/or one or more databases 314. In addition, platform 310 may be communicatively connected to one or more user systems 330 via one or more networks 320. Platform 310 may also be communicatively connected to one or more telematics control units (TCUs) 340 via one or more networks 320. Each telematics control unit 340 may be installed in and correspond to one vehicle (e.g., within one or more fleets of vehicles) or one generator.

Network(s) 320 may comprise the Internet, and platform 310 may communicate with user system(s) 330 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 310 is illustrated as being connected to various systems through a single set of network(s) 320, it should be understood that platform 310 may be connected to the various systems via different sets of one or more networks. For example, platform 310 may be connected to a subset of user systems 330 and/or telematics control units 340 via the Internet, but may be connected to one or more other user systems 330 and/or telematics control units 340 via an intranet. Furthermore, while only a few user systems 330 and telematics control units 340, one server application 312, and one set of database(s) 314 are illustrated, it should be understood that the infrastructure may comprise any number of user systems, telematics control units, server applications, and databases.

User system(s) 330 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like.

Platform 310 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 310 transmits or serves one or more screens of the graphical user interface in response to requests from user system(s) 330. In some embodiments, these screens may be served in the form of a wizard, in which case two or more screens may be served in a sequential manner, and one or more of the sequential screens may depend on an interaction of the user or user system 330 with one or more preceding screens. The requests to platform 310 and the responses from platform 310, including the screens of the graphical user interface, may both be communicated through network(s) 320, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 314) that are locally and/or remotely accessible to platform 310. Platform 310 may also respond to other requests from user system(s) 330.

Platform 310 may further comprise, be communicatively coupled with, or otherwise have access to one or more database(s) 314. For example, platform 310 may comprise one or more database servers which manage one or more databases 314. A user system 330, a telematics control unit 340, or a server application 312 executing on platform 310 may submit data (e.g., user data, form data, etc.) to be stored in database(s) 314, and/or request access to data stored in database(s) 314. Any suitable database may be utilized, including without limitation My SQL™, Oracle™, IBM™, Microsoft SQL™, Access™, PostgreSQL™, and the like, including cloud-based databases and proprietary databases. Data may be sent to platform 310, for instance, using the well-known POST request supported by HTTP, via FTP, and/or the like. This data, as well as other requests, may be handled, for example, by server-side web technology, such as a servlet or other software module (e.g., comprised in server application 312), executed by platform 310.

In embodiments in which a web service is provided, platform 310 may receive requests from external systems, and provide responses in eXtensible Markup Language (XML), JavaScript Object Notation (JSON), and/or any other suitable or desired format. In such embodiments, platform 310 may provide an application programming interface (API) which defines the manner in which user system(s) 330, telematics control units 340, and/or external systems may interact with the web service. User system(s) 330 and/or the external systems, which may themselves be servers, can define their own user interfaces, and rely on the web service to implement or otherwise provide the backend processes, methods, functionality, storage, and/or the like, described herein. For example, in such an embodiment, a client application 332 (e.g., with access to a local database 334) executing on one or more user system(s) 330 may interact with a server application 312 executing on platform 310 to execute one or more or a portion of one or more of the various functions, processes, methods, and/or software modules described herein. Client application 332 may be "thin," in which case processing is primarily carried out server-side by server application 312 on platform 310. A basic example of a thin client application 332 is a browser application, which simply requests, receives, and renders webpages at user system(s) 330, while server application 312 on platform 310 is responsible for generating the webpages and managing database functions. Alternatively, the client application may be "thick," in which case processing is primarily carried out client-side by user system(s) 330. It should be understood that client application 332 may perform an amount of processing, relative to server application 312 on platform 310, at any point along this spectrum between "thin" and "thick," depending on the design goals of the particular implementation. In any case, the application described herein, which may wholly reside on either platform 310 (e.g., in which case server application 312 performs all processing) or user system(s) 330 (e.g., in which case client application 332 performs all processing) or be distributed between platform 310 and user system(s) 330 (e.g., in which case server application 312 and client application 332 both perform processing), can comprise one or more executable software modules that implement one or more of the processes, methods, or functions of the application described herein.

1.2. Example Processing Device

Figure 4:
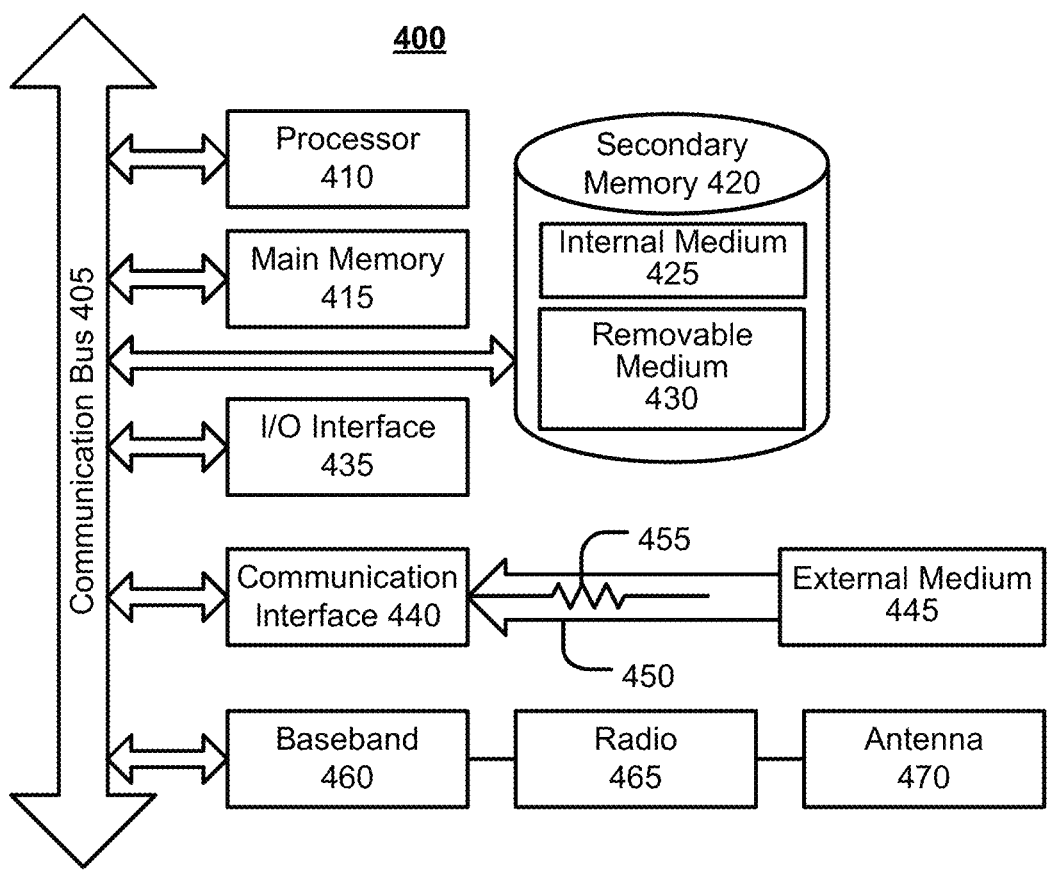
FIG. 4 illustrates an example processing system, by which one or more of the processes described herein, may be executed, according to an embodiment.

FIG. 4 is a block diagram illustrating an example wired or wireless system 400 that may be used in connection with various embodiments described herein. For example, system 400 may be used as or in conjunction with one or more of the functions, processes, or methods (e.g., to store and/or execute the application or one or more software modules of the application) described herein, and may represent components of platform 310, user system(s) 330, telematics control unit(s) 340, and/or other processing devices described herein. System 400 can be a server or any conventional personal computer, or any other processor-enabled device that is capable of wired or wireless data communication. Other computer systems and/or architectures may be also used, as will be clear to those skilled in the art.

System 400 preferably includes one or more processors, such as processor 410. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 410. Examples of processors which may be used with system 400 include, without limitation, the Pentium® processor, Core i7® processor, and Xeon® processor, all of which are available from Intel Corporation of Santa Clara, Calif.

Processor 410 is preferably connected to a communication bus 405. Communication bus 405 may include a data channel for facilitating information transfer between storage and other peripheral components of system 400. Furthermore, communication bus 405 may provide a set of signals used for communication with processor 410, including a data bus, address bus, and/or control bus (not shown). Communication bus 405 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 400 preferably includes a main memory 415 and may also include a secondary memory 420. Main memory 415 provides storage of instructions and data for programs executing on processor 410, such as one or more of the functions and/or modules discussed herein. It should be understood that programs stored in the memory and executed by processor 410 may be written and/or compiled according to any suitable language, including without limitation C/C++, Java, JavaScript, Perl, Visual Basic, .NET, and the like. Main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 420 may optionally include an internal medium 425 and/or a removable medium 430. Removable medium 430 is read from and/or written to in any well-known manner. Removable storage medium 430 may be, for example, a magnetic tape drive, a compact disc (CD) drive, a digital versatile disc (DVD) drive, other optical drive, a flash memory drive, and/or the like.

Secondary memory 420 is a non-transitory computer-readable medium having computer-executable code (e.g., disclosed software modules) and/or other data stored thereon. The computer software or data stored on secondary memory 420 is read into main memory 415 for execution by processor 410.

In alternative embodiments, secondary memory 420 may include other similar means for allowing computer programs or other data or instructions to be loaded into system 400. Such means may include, for example, a communication interface 440, which allows software and data to be transferred from external storage medium 445 to system 400. Examples of external storage medium 445 may include an external hard disk drive, an external optical drive, an external magneto-optical drive, and/or the like. Other examples of secondary memory 420 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 400 may include a communication interface 440. Communication interface 440 allows software and data to be transferred between system 400 and external devices (e.g. printers), networks, or other information sources. For example, computer software or executable code may be transferred to system 400 from a network server (e.g., platform 310) via communication interface 440. Examples of communication interface 440 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 400 with a network (e.g., network(s) 320) or another computing device. Communication interface 440 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 440 are generally in the form of electrical communication signals 455. These signals 455 may be provided to communication interface 440 via a communication channel 450. In an embodiment, communication channel 450 may be a wired or wireless network (e.g., network(s) 320), or any variety of other communication links. Communication channel 450 carries signals 455 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 415 and/or secondary memory 420. Computer programs can also be received via communication interface 440 and stored in main memory 415 and/or secondary memory 420. Such computer programs, when executed, enable system 400 to perform the various functions of the disclosed embodiments as described elsewhere herein.

In this description, the term "computer-readable medium" is used to refer to any non-transitory computer-readable storage media used to provide computer-executable code and/or other data to or within system 400. Examples of such media include main memory 415, secondary memory 420 (including internal memory 425, removable medium 430, and external storage medium 445), and any peripheral device communicatively coupled with communication interface 440 (including a network information server or other network device). These non-transitory computer-readable media are means for providing executable code, programming instructions, software, and/or other data to system 400.

In an embodiment that is implemented using software, the software may be stored on a computer-readable medium and loaded into system 400 by way of removable medium 430, I/O interface 435, or communication interface 440. In such an embodiment, the software is loaded into system 400 in the form of electrical communication signals 455. The software, when executed by processor 410, preferably causes processor 410 to perform one or more of the processes and functions described elsewhere herein.

In an embodiment, I/O interface 435 provides an interface between one or more components of system 400 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 400 may also include optional wireless communication components that facilitate wireless communication over a voice network and/or a data network (e.g., in the case of user system 330). The wireless communication components comprise an antenna system 470, a radio system 465, and a baseband system 460. In system 400, radio frequency (RF) signals are transmitted and received over the air by antenna system 470 under the management of radio system 465.

In an embodiment, antenna system 470 may comprise one or more antennae and one or more multiplexors (not shown) that perform a switching function to provide antenna system 470 with transmit and receive signal paths. In the receive path, received RF signals can be coupled from a multiplexor to a low noise amplifier (not shown) that amplifies the received RF signal and sends the amplified signal to radio system 465.

In an alternative embodiment, radio system 465 may comprise one or more radios that are configured to communicate over various frequencies. In an embodiment, radio system 465 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 465 to baseband system 460.

If the received signal contains audio information, then baseband system 460 decodes the signal and converts it to an analog signal. Then the signal is amplified and sent to a speaker. Baseband system 460 also receives analog audio signals from a microphone. These analog audio signals are converted to digital signals and encoded by baseband system 460. Baseband system 460 also encodes the digital signals for transmission and generates a baseband transmit audio signal that is routed to the modulator portion of radio system 465. The modulator mixes the baseband transmit audio signal with an RF carrier signal, generating an RF transmit signal that is routed to antenna system 470 and may pass through a power amplifier (not shown). The power amplifier amplifies the RF transmit signal and routes it to antenna system 470, where the signal is switched to the antenna port for transmission.

Baseband system 460 is also communicatively coupled with processor 410, which may be a central processing unit (CPU). Processor 410 has access to data storage areas 415 and 420. Processor 410 is preferably configured to execute instructions (i.e., computer programs, such as the disclosed application, or software modules) that can be stored in main memory 415 or secondary memory 420. Computer programs can also be received from baseband processor 460 and stored in main memory 410 or in secondary memory 420, or executed upon receipt. Such computer programs, when executed, enable system 400 to perform the various functions of the disclosed embodiments.

1.3. Telematics Control Unit

Most modern vehicles are manufactured with an installed engine management system (EMS). Generally, the engine management system collects data from various sensors within the vehicle, analyzes the data, and controls various actuators in the engine to optimize the engine's performance. The, data collected by the engine management system are generally accessible via an OBD interface provided by a physical OBD port.

In an embodiment, a telematics control unit 340 is installed in the vehicle and connected to the OBD port to interface with the vehicle data bus (e.g., Controller Area Network (CAN) bus), using standard protocols (e.g., Society of Automotive Engineers (SAE) J1939, SAE J1587, Unified Diagnostic Services (UDS), Keyword Protocol (KWP), etc.), to acquire a subset of the data collected by the engine management system. For example, telematics control unit 340 may collect the fuel level in the fuel tank (e.g., as measured by a sensing system 100) and the fuel injection rate in the engine. The fuel injection rate is generally sampled by the engine management system from modern, drive-by-wire, fuel injection systems, such as common rail direct injection (CRDI), gasoline direct injection (GDI), or unit pump fuel injection systems, and the like. Telematic control unit 340 may also collect geospatial data from a Global Navigation Satellite System (GNSS) of the engine management system, inertial navigation system (INS) of the engine management system, and/or an integrated navigation system within telematics control unit 340, and/or collect vehicle odometer data from the engine management system. Telematics control unit 340 may then transmit this collected data over network 320 (e.g., comprising a cellular or satellite network) to platform 310, which may represent a cloud-based platform that executes software implementing sub-resolution measurement for the vehicle in which the telematics control unit 340 is installed. Telematics control unit 340 may collect and transmit the data in real time or periodically as batches. As used herein, the term "real time" should be understood to include near-real time or contemporaneity that results from latencies in processing and communications.

Results of the sub-resolution measurements, for one or each of a plurality of vehicles with installed telematics control units 340, may be stored in database 314. In response to a user request, the sub-resolution measurements for a given vehicle may be displayed in the graphical user interface of the application. For example, the sub-resolution measurements may be displayed as a line graph of continuous fuel levels over distance and/or time. While embodiments will primarily be described with respect to the monitoring of fuel levels in vehicles, all of the disclosed embodiments may be equally applied to any apparatus with an internal combustion engine, such as a generator. In the event that the apparatus does not travel, as a vehicle does, any of the distance measurements described herein may be replaced with a measure of engine hours (i.e., the number of hours that the engine is running).

2. Process Overview

Embodiments of processes for sub-resolution measurement of fuel level will now be described in detail. It should be understood that the described processes may be embodied in one or more software modules that are executed by one or more hardware processors (e.g., processor 410), for example, as the application discussed herein (e.g., server application 312, client application 332, and/or a distributed application comprising both server application 312 and client application 332), which may be executed wholly by processor(s) of platform 310, wholly by processor(s) of user system(s) 330, or may be distributed across platform 310 and user system(s) 330, such that some portions or modules of the application are executed by platform 310 and other portions or modules of the application are executed by user system(s) 330. The described processes may be implemented as instructions represented in source code, object code, and/or machine code. These instructions may be executed directly by hardware processor(s) 410, or alternatively, may be executed by a virtual machine operating between the object code and hardware processors 410. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Overall Algorithm

Figure 5:
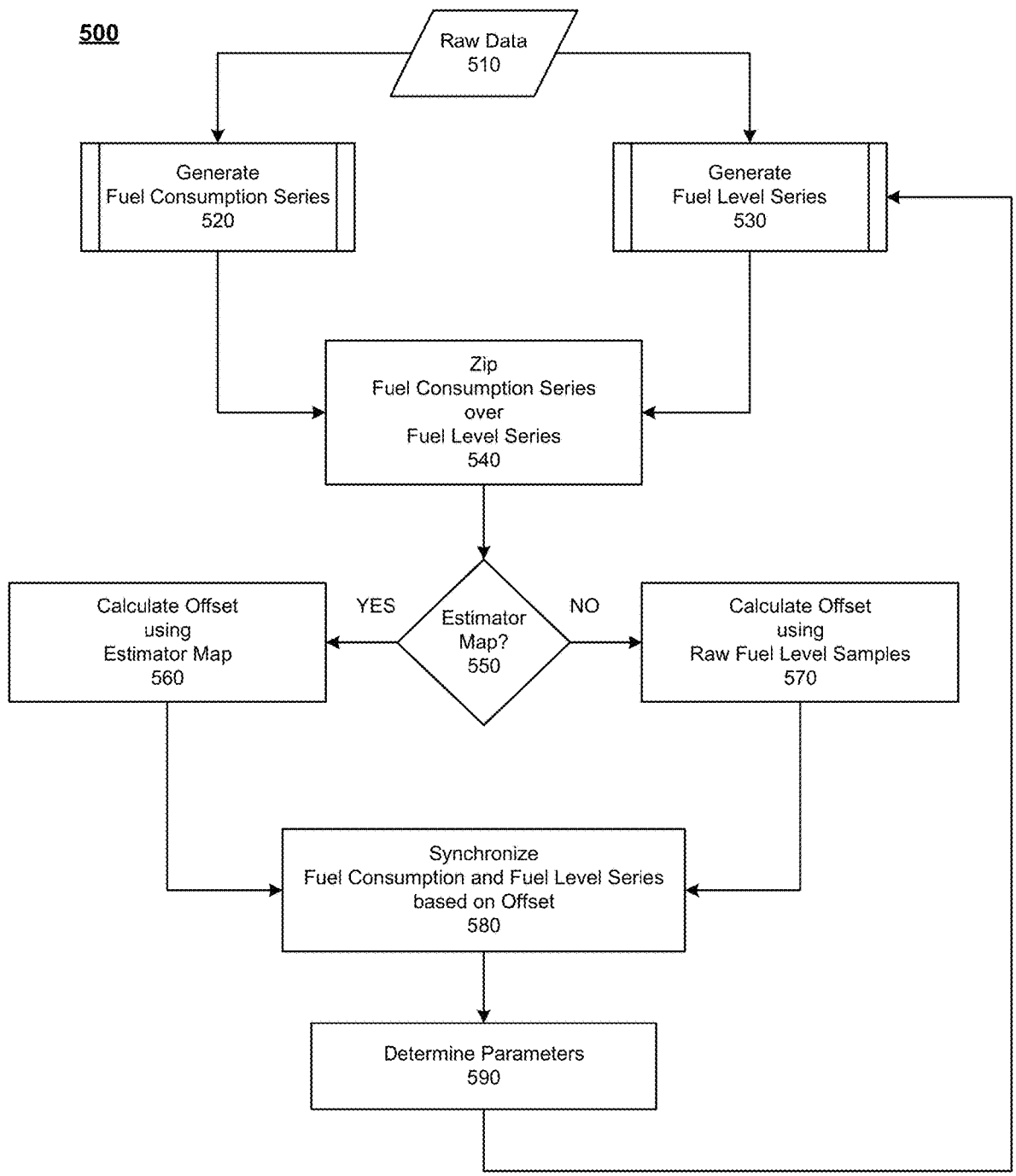
FIG. 5 illustrates an algorithm for sub-resolution measurement of fuel level, according to an embodiment.

FIG. 5 illustrates an algorithm 500 for sub-resolution measurement of fuel level, according to an embodiment. Algorithm 500 may be executed continually or continuously by server application 312 on platform 310 as raw data 510 is received from a telematics control unit 340 installed in a vehicle or other apparatus (e.g., generator). Raw data 510 may be received in real time or as batches received periodically from telematics control unit 340. A copy of algorithm 500 may be executed independently for each vehicle being monitored. In other words, each vehicle (e.g., in one or more fleets of vehicles managed by users of platform 310) may be independently and discretely modeled by a separate execution of algorithm 500.

In subprocess 520, a fuel consumption series is generated from at least a subset of raw data 510, including, for example, fuel injection rates (e.g., fuel volume or weight over unit time), geospatial data or odometer values, engine hours, and/or the like. In addition, in subprocess 530, a fuel level series is generated from at least a subset of raw data 510, including, for example, fuel level (e.g., measured as a percentage of fuel tank capacity), the volume or capacity of the fuel tank, geospatial data or odometer values, engine hours, and/or the like.

In subprocess 540, the fuel consumption series is zipped over the fuel level series. Essentially, for each vehicle being monitored, algorithm 500 aligns a fuel level series and fuel consumption series, over a distance traversed by that vehicle and/or engine run time. As described in more detail elsewhere herein, each data point in the fuel level series may be classified into one of a plurality of ordinal bins that are aligned with sub-ranges of the fuel consumption series. In an embodiment, the fuel consumption and fuel level series may be aligned using refill events. The fuel consumption series, as a continuous integral, serves as the mechanism for sub-resolution measurements of fuel level between the discrete levels represented in the fuel level series.

In subprocess 550, algorithm 500 determines whether or not there is an existing estimator map. As described in more detail elsewhere herein, the estimator map is a data structure that statefully maps fuel levels to the fuel consumption series. In an embodiment, the estimator map is not created until after the first tank-top refill, and comprises projections of fuel level values subsequent to the refill event. These projections represent estimates of the fuel level based on the relevant sub-range of the fuel consumption series. In other words, the estimator map maps sub-ranges of the fuel consumption series to bins in the fuel level series. If the estimator map exists (i.e., "Yes" in subprocess 550), the estimator is used to calculate the offset for calibration in subprocess 560. Otherwise, if the estimator map does not yet exist (i.e., "No" in subprocess 550), the offset for calibration is calculated using raw fuel level values in subprocess 570. This dynamically updating estimator map enables the model, comprising the fuel consumption and fuel level series, to adapt to deflections in the fuel level calibration curves that result from wear and tear of the fuel level sensors, distortions in the fuel tank, and/or the like.

In subprocess 560, the offset for calibration is determined using the estimator map. For example, the offset may be determined using bin-wise estimates of fuel level values along cluster tails to map the fuel level series to the fuel consumption series. Any refill or pilferage event may be represented by a set of clusters that separate on the fuel level-to-distance/engine hours plane due to a sudden dispersion. For example, a refill event may be represented by two clusters: $C_i$ immediately preceding the refill event; and $C_{i+1}$ immediately following the refill event. To calculate the offset using the estimator map, an initial level may be defined from the values of the fuel consumption series corresponding to fuel level values at the tail end of cluster $C_i$ immediately before the refill event, and a final level may be defined from the projected values of the fuel consumption series for fuel level values at the head end of cluster $C_{i+1}$ immediately after the refill event. The offset is then calculated as the difference between the final level and the initial level.

In subprocess 570, the offset for calibration is determined using raw fuel level values. For example, an offset may be calculated that aligns the fuel consumption series to raw fuel level values at the tails of clusters that are immediately subsequent to refill and/or pilferage events detected in the fuel level series. To calculate the offset without the estimator map, an initial level may be defined from the values of the fuel consumption series corresponding to fuel level values at the tail end of cluster $C_i$ immediately before the refill event, and a final level may be defined from the raw fuel level values at the head end of cluster $C_{i+1}$ immediately after the refill event. The offset is then calculated as the difference between the final level and the initial level.

In subprocess 580, the fuel consumption series and the fuel level series are synchronized or aligned based on the offset determined in subprocess 560 or 570. In particular, the fuel consumption series may be shifted or calibrated across refill and pilferage events to run in synchronization with the fuel level series. Calibration refers to the process of running the fuel level and fuel consumption series in synchrony across refill and pilferage events. For instance, refill and pilferage events comprise instances of clusters that are separated on the fuel level-distance plane. Within each cluster, the fuel level and fuel consumption series run in synchrony, with differences in simultaneous discrete fuel levels in the fuel level series corresponding to an interval in the fuel consumption series as a volume of fuel being injected into the engine for combustion. A refill event can be mapped to any upward shift in fuel level from a first $Cluster_1$ to a second $Cluster_2$. The fuel level and fuel consumption series are in synchrony at $Cluster_1$. However, after the refill event, the fuel consumption series must be shifted upwards by a volume $V_{calibration}$ to match $Cluster_2$. This process of shifting the fuel consumption series is what is referred to herein as calibration, and the volume $V_{calibration}$ is treated as the offset.

The synchronized fuel consumption and fuel level series may be appended to a stored state for the particular vehicle being monitored. In other words, after calibration, the fuel level and fuel consumption series are now synchronized (i.e., running close to each other within the fuel level-distance plane), and are added to the stored state for the vehicle being monitored. The offsets may also serve as prospective volumes for refill and pilferage events. For example, the volume $V_{calibration}$ is the refill amount for the refill event described above.

Figure 6:
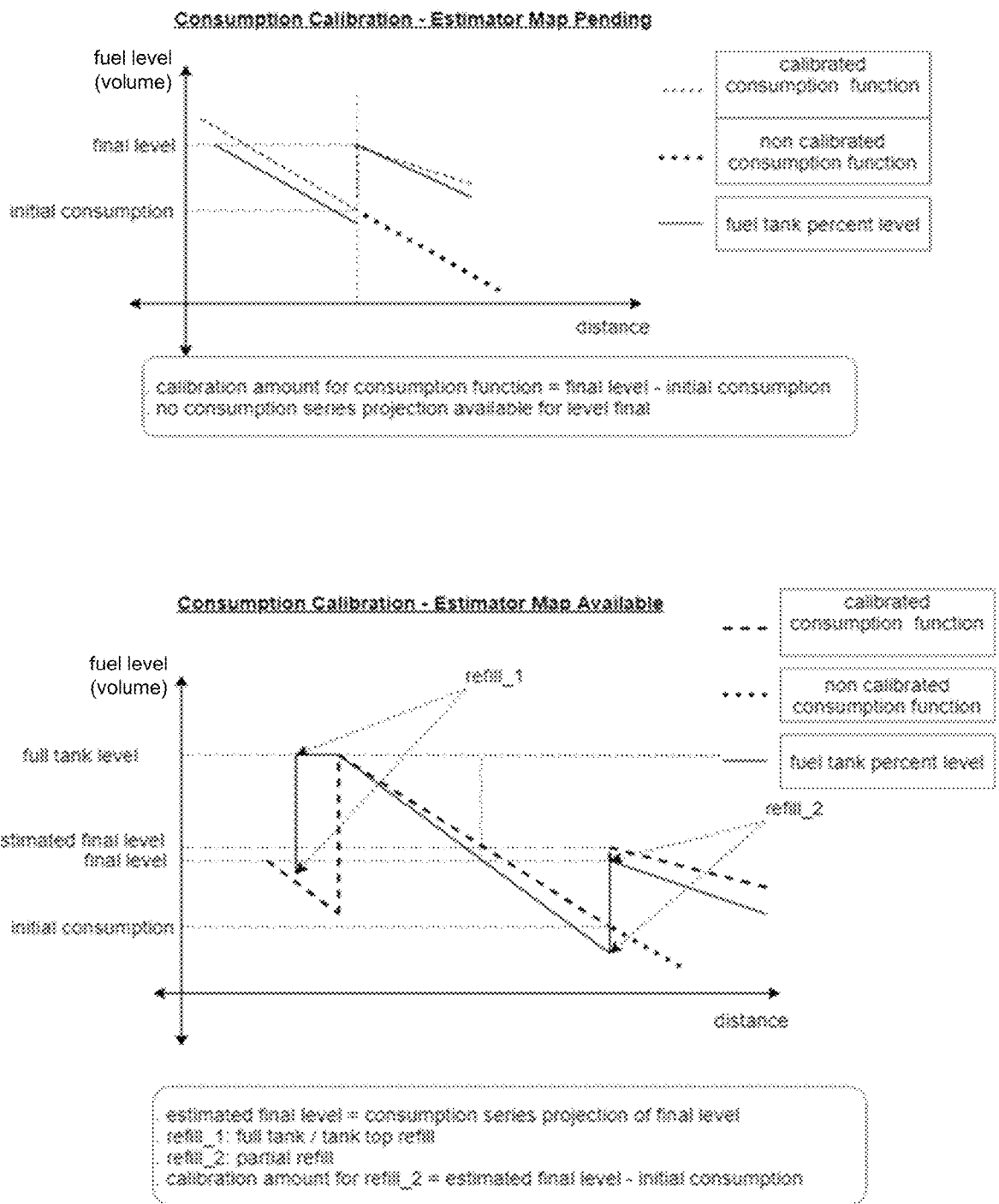
FIG. 6 illustrates an example calibration of a fuel consumption series, according to an embodiment.

FIG. 6 illustrates an example calibration of the fuel consumption series, according to an embodiment. In the illustrated example, a first refill event, refill_1, and a second refill event, refill_2, are used to calibrate the fuel consumption series. The first refill event is a tank-top refill (i.e., a refill to full or nearly full capacity of the fuel tank), whereas the second refill event is a partial refill (i.e., a refill to less than full or nearly full capacity of the fuel tank).

A state synchronization between the fuel level series and the fuel consumption series is attained after the first tank-top refill event (i.e., refill_1) is detected. From then on, algorithm 500 maintains an estimator map that estimates fuel level values as a function of the fuel consumption series. For example, as illustrated in the top graph in FIG. 6, before the estimator map has been created, the offset is calculated as the difference between the final level after a refill and the initial fuel consumption level before the refill. Then, as illustrated in the bottom graph in FIG. 6, once the estimator map has been created, the offset after refill_2 is calculated as the difference between the estimated final level after the refill (i.e., according to the estimator map) and the initial fuel consumption level before the refill. In other words, once the estimator map has been created, the estimated final level, which is a projection of the final level based on the fuel consumption series, is used instead of the final level as determined from raw fuel level values.

In an embodiment, the estimator map exhibits one or more of the following features:
Continuous bins over the fuel level series from a completely empty fuel tank (i.e., fuel level at 0% of capacity) to a completely full fuel tank (i.e., fuel level at 100% of capacity), with the bin size based on resolution requirements. The fuel consumption series is grouped into sub-ranges, with each sub-range corresponding to one the bins of the fuel level series.
Distribution characteristics of the fuel consumption series, such as median and interquartile range for the sub-ranges of the fuel consumption series, are mapped across the bins of the fuel level series. In other words, for each fuel level bin, summary statistics of the fuel consumption values, sampled from the fuel consumption series, are evaluated. These statistics include the median ($Q_2$) and interquartile range (IQR) of the distribution of fuel consumption values.

Dispersion characteristics of the fuel consumption series, such as standard deviation over the sub-ranges of the fuel consumption series, serve as a mechanism for mapping entropy within the estimator map. In other words, for each fuel level bin, statistics are calculated for dispersion in the corresponding fuel consumption values. For example, these statistics may comprise the standard deviation of the corresponding fuel consumption values. Fuel level bins with high standard deviations may be excluded when mapping fuel level values to projections in the fuel consumption series.

The feature values for each bin in the fuel level series propagate over refill cycles, during run time, based on bin-wise support of fuel consumption values for a given state (e.g., a context represented by distance/engine hours) and new refill cycles. In other words, for each fuel level bin, the calculated statistics (e.g., standard deviation, median, interquartile range, etc.) are updated using each new refill cycle (e.g., an interval of values from one refill event to the next refill event). Updates may be performed using weighted averages. Weights may be derived using bin-wise support (e.g., count) of fuel consumption values in the stored state for the vehicle and bin-wise support of fuel consumption values that have been aggregated over the new refill cycle. It should be understood that the fuel consumption values in the stored state may represent fuel consumption values that have been aggregated over extensive distances and engine hours, including a plurality of refill cycles.

In subprocess 590, parameters may be determined for use in subprocess 530 and/or other subprocesses. The parameters may comprise dispersion characteristics in the fuel level series. For example, the sampling frequency over distance in the fuel level series may be used to dynamically configure a sliding window, and localized measures of dispersion may be evaluated within each sliding window. Initially, prior to the accumulation of data for a particular vehicle, the sliding window may be configured according to a default configuration. However, as data accumulates in the stored state for the vehicle, the sliding window may be dynamically reconfigured to capture localized measures of dispersions, such as standard deviation. Dispersion in the fuel level series, aggregated over a sufficiently large distance (e.g., on the order of thousands of kilometers), may be evaluated, using localized windows, for large dispersions, representing inflection points, within a predetermined margin of error. Dispersions that are plotted as fuel level versus distance for a refill cycle fit an exponential curve. Smaller dispersions along this represent sloshing as a result of vehicle dynamics, whereas dispersions beyond the point of inflection represent refill and/or pilferage events.

Prior to clustering, the sliding window may be used to dampen sloshing-induced dispersions by averaging fuel level values sampled over a periodic distance or engine run time. For example, a simple moving average (SMA) may be computed over the sliding window. The length of the sliding window may be selected based on the size of the fuel tank and the sampling frequency over distance or engine hours. Thus, a longer sliding window may be used for larger fuel tanks than for smaller fuel tanks. In addition, a shorter sliding window may be used for higher sampling frequencies than for lower sampling frequencies. The size of the sliding window may be adjusted as the size of the fuel tank and/or sampling frequency is learned or changes over time.

During clustering, a sliding window may be used to automatically configure clustering parameters. For example, standard deviation may be calculated for each window, as the window slides across a refill cycle. The distribution of standard deviations across the refill cycle may then be analyzed for inflection points that distinguish refill and pilferage events form sloshing. In this case, the length of the sliding window may be defined by higher quantiles of fuel level sampling frequencies measured over distance (e.g., 1 kilometer), so that the sliding window can accommodate at least ten to fifteen fuel level values across jitter.

Dispersion along the fuel level scale may be evaluated with contextual fuel efficiency to determine convergence over the distance scale. Clustering takes place on the fuel level-distance plane. Each cluster may be visualized as an ellipse, with fuel level along the minor axis and distance along the major axis. Dispersion tracking enables the algorithm to learn the configuration for the minor axis. The configuration for the major axis may be determined by correlating the minor axis with fuel efficiency estimates derived from the stored state for the vehicle. In particular, contextual fuel consumption-distance sub-ranges, retrieved from the stored state, may be used.

Figure 1:
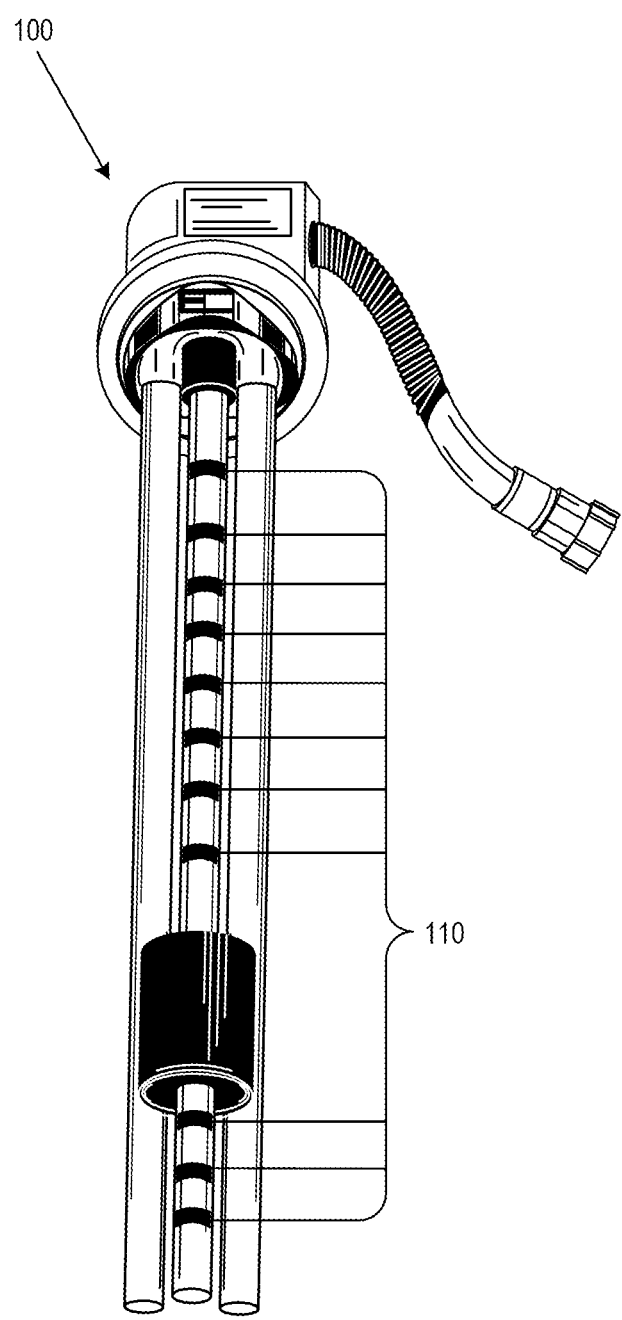
FIG. 1 illustrates an example of a fuel-level sensing system.
Figure 2:
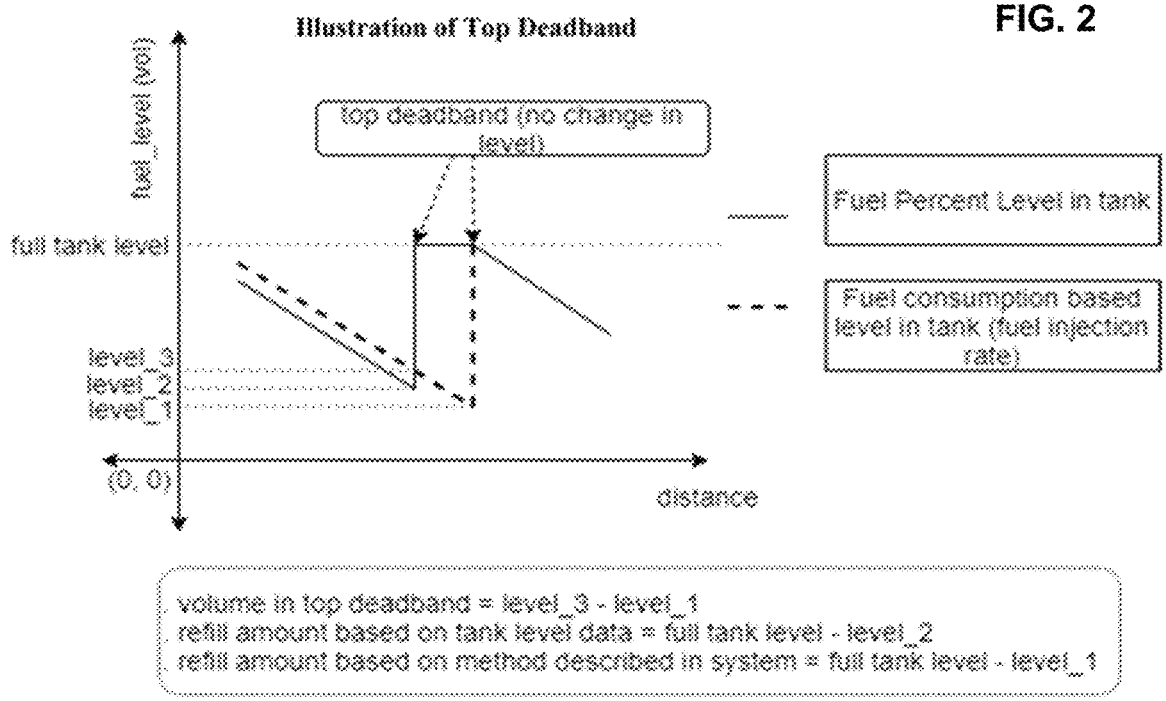
FIG. 2 illustrates top and bottom dead-bands.
Figure 2:
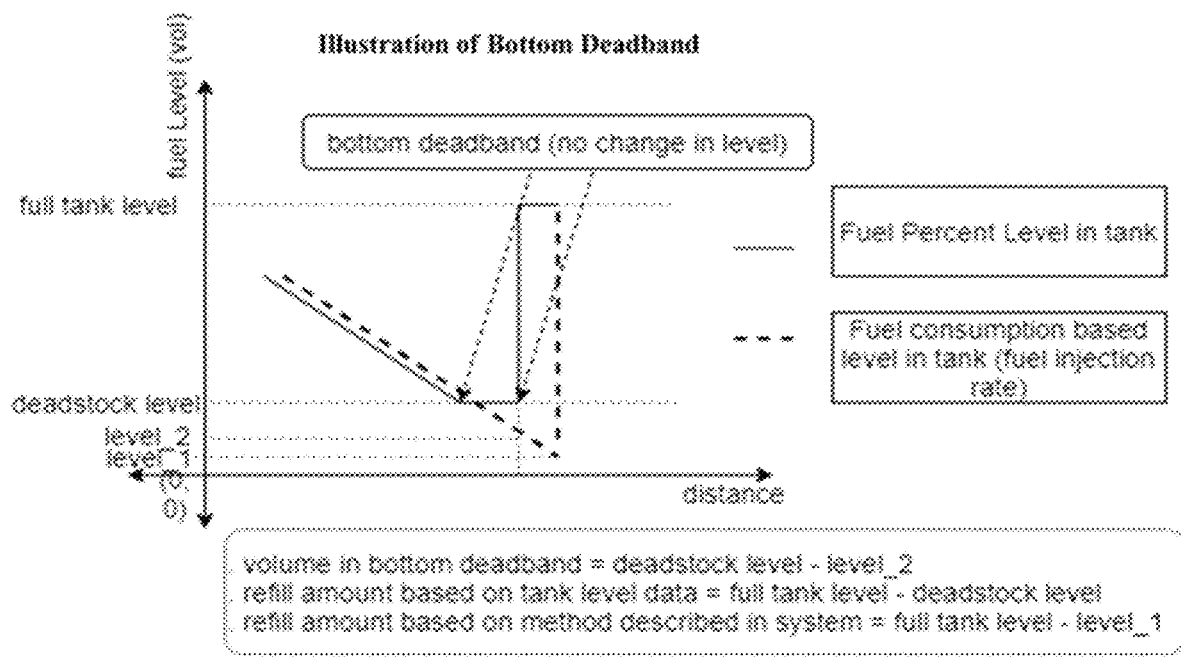

Notably, positive offsets during tank-top refill events may be biased using fuel consumption sub-ranges for the top dead-band in which the fuel level values do not change over a significant distance. In an embodiment, the fuel consumption series is calibrated to match the fuel level series only after at least one transition from a full fuel tank is recorded (e.g., after the first tank-top refill event is detected as an inflection point). For example, with reference to the top graph in FIG. 2, the volume of fuel in the top dead-band may be calculated, after a tank-top refill, as the difference between the fuel level before the refill (i.e., level_3) and the projected fuel level (i.e., level_1) after the raw fuel level falls below its maximum. This difference represents the volume of fuel that is consumed immediately after the tank-top refill and before the sampled fuel level decreases below the top-most discrete fuel level. In addition, with reference to the bottom graph in FIG. 2, the volume of fuel in the bottom dead-band may be calculated as the difference between the minimum fuel level (i.e., deadstock level, representing the bottom-most discrete fuel level) and the fuel level (i.e., level_2) immediately before the refill event. This difference represents the volume of fuel that is consumed immediately after the sampled fuel level plateaus at the bottom-most discrete fuel level until the refill event. Thus, the top and bottom dead-bands can be calculated across one or more refill events.

Essentially, algorithm 500 derives and maintains, for each vehicle or other apparatus being monitored, a perpetually maturing and adaptive mapping of discrete fuel level values to a continuous fuel consumption function. This estimator map enhances the limited resolution of electromagnetic-based sensors, or other sensors that utilize discrete levels, by integrating data between the discrete levels using fuel injection rates. Fuel volume in the top dead-band can be determined by dynamically tracking a shift in distribution from the top-most discrete level using a variance-based algorithm, and integrating the fuel injection rate until the fuel level value transitions below the top-most discrete level. Similarly, fuel volume in the bottom dead-band can be determined by dynamically tracking a shift in distribution from the bottom-most discrete level using a variance-based algorithm, and integrating the fuel injection rate until a refill event is detected that increases the fuel level above the bottom-most discrete level. Once the fuel volume in the top and bottom dead-bands are determined, precise fuel volumes can be computed, even if the fuel tank is filled above the top-most sensor or depleted below the bottom-most sensor. Thus, algorithm 500 compensates for the uncertainties around the values of fuel levels in the top and bottom dead-bands. In addition, the clustering, which learns configurations over time, reduces the uncertainty in fuel levels arising from dynamic conditions, such as vehicle orientation or inclination, vapor pressure inside the fuel tank, and/or the like. Conventional pre-calibrated synthetic fuel level curves cannot compensate for these types of uncertainty.

Advantageously, algorithm 500 may be executed on platform 310 using data obtained from existing OEM-installed sensors (e.g., switch-based, capacitive, etc.) and transmitted to platform 310 via telematics control unit 340. Thus, no retrofitting or tedious calibration of customized sensors is required. Algorithm 500 provides sub-resolution measurements that enable a conventional switch-based sensor to deliver accuracy that is as good as or better than a continuous-range capacitive sensor. This enables, for example, more precise real-time estimates of fuel level for a more reliable distance-to-empty estimate.

In addition, the model, according to algorithm 500, continually learns and adapts based on new raw data 510 and the parameters determined in subprocess 590, so as to evolve with the vehicle or other apparatus. For example, the continuously evolving fuel consumption series can compensate for corrosion-induced distortion in calibration curves, which typically manifest as the skipping of discrete levels in switch-based sensors, or sudden shifts or nonlinear trends in the fuel level output by capacitive sensors. The synchronized series can also adapt to localized changes in gradient in the fuel level curves that result from deformation in the shape of the fuel tank or distortion in the orientation of the fuel tank, which are common phenomena on externally mounted fuel tanks (e.g., on heavy commercial vehicles).

Notably, the non-conditional transfer of the fuel level series on the fuel consumption series has an inherent advantage over a system which switches between raw fuel consumption and fuel-level-based measurements in accordance with driving conditions. In particular, algorithm 500 does not depend on the efficacy of micro electromechanical systems (MEMS) sensors to classify stable and unstable driving conditions. Most MEMS sensors for inertial measurements exhibit drift, resulting from temperature and other ambient conditions. Powertrain-integrated sensors, such as engine-speed sensors and transmission-mode sensors, cannot be used to independently detect dynamic driving conditions that may result in sloshing, and such sensors are subject to the wear and tear that results from the age and operating conditions of the vehicle.

The sloshing of fuel in the fuel tank increases with vehicle speed and worsening road conditions (e.g., off-highway vs. on-highway). The vehicle's suspension and tires can also affect the degree of sloshing. For power generators, the frequency and amplitude of sloshing may be a function of the flow in the return line of the fuel system. Advantageously, the disclosed model, comprising the fuel consumption and fuel level series, learns from a distribution of sloshing, as represented by deviations in fuel levels. The model may classify each sudden change in fuel level as either a refill event, a pilferage event, or sloshing, based on amplitude and/or frequency, in order to distinguish sloshing from refill and pilferage events. The model uses a density-based clustering algorithm to process fuel level data to generate segments of the fuel level series, representing fuel flowing into the engine for combustion, that are separated by refill and pilferage events. These segments may be smoothed using a non-parametric regression algorithm, for example, to reduce or eliminate sloshing-based dispersions.

Advantageously, the disclosed model does not depend on an equivalence ratio, determined using feedback from an oxygen sensor, to compute fuel consumption. Rather, algorithm 500 computes fuel consumption using fuel injection rates that are queried from the engine management system. The efficiency of estimates of fuel injection rate decreases with wear and tear of components in the fuel pump assembly (e.g., high pressure pump), fuel pressure regulators, and fuel injectors. In an embodiment, the model compensates for this decrease in efficiency by estimating a representative, low positive fuel injection rate for a theoretical cut-off during a coasting scenario. This may be achieved via continuous learning from fuel injection rate distributions, mapped across engine load and torque characteristics over several thousands of kilometers.

2.2. Fuel Consumption Series

Figure 7:
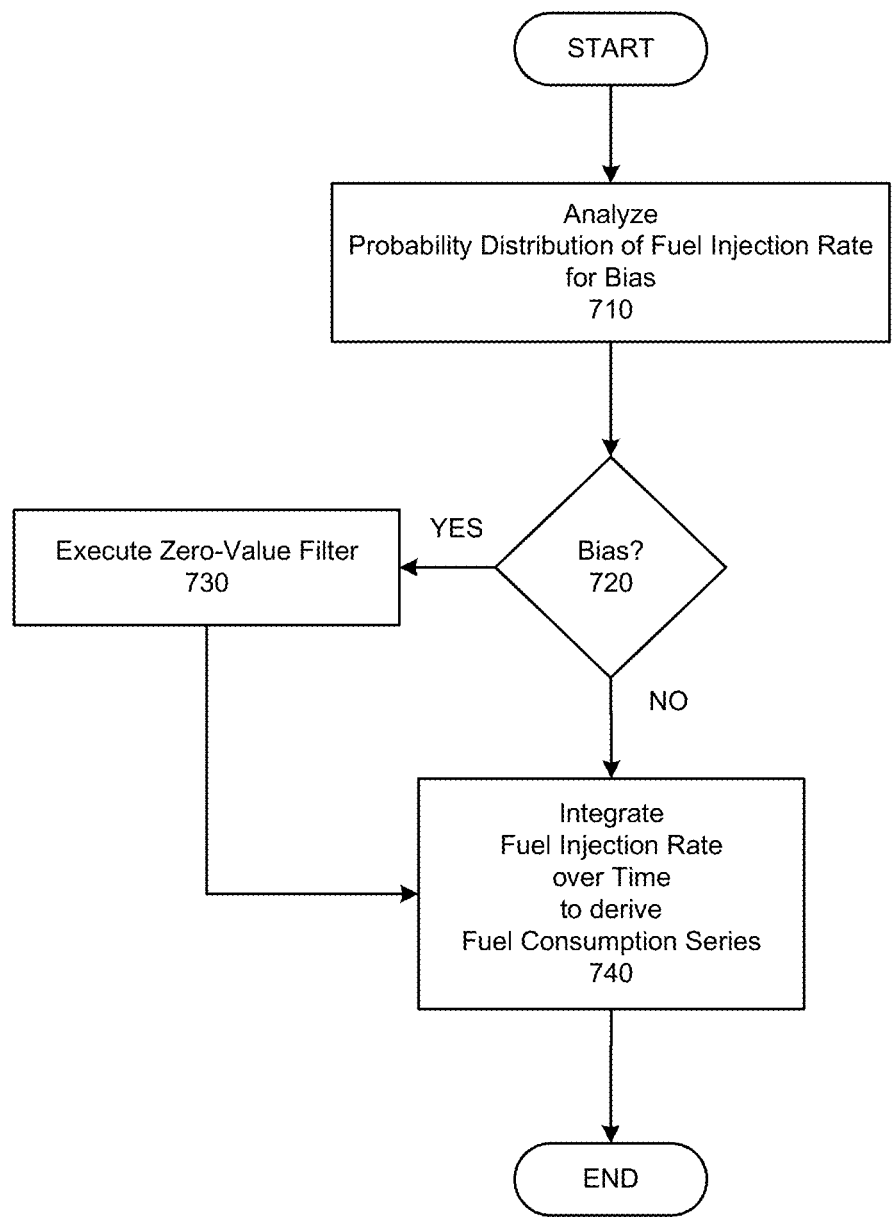
FIG. 7 illustrates an example subprocess for generating a fuel consumption series, according to an embodiment.

FIG. 7 illustrates an example of subprocess 520 for generating the fuel consumption series, according to an embodiment. Subprocess 520 may utilize fuel injection data from raw data 510 (e.g., acquired from the engine management system and/or inertial navigation system). The fuel injection data may comprise volume or weight of fuel consumed over unit time. In addition, subprocess 520 may utilize engine hours, geospatial data, and/or odometer values. For example, any distance used by any embodiments described herein may be measured by summing distances between geospatial coordinates over time and/or by subtracting a beginning odometer value from an ending odometer value.

In subprocess 710, the probability distribution of the fuel injection rate is analyzed for bias around the extremities. For example, bias towards lower quantiles suggests unreliable fuel injection signals during coasting and/or braking with no driver demand torque. The distribution of fuel injection rates (e.g., liters per hour L/H), evaluated over a significant distance, exhibits a Gaussian shape with heavy tails (e.g., Leptokurtic in nature). In subprocess 710, algorithm 500 tracks a bias around negative tails, i.e., lower quantiles of the probability distribution of fuel injection rates in the vicinity of 0 L/H to 5 L/H, subject to engine displacement. If a significant probability is found around 0 L/H and the normal or median is very distant, algorithm 500 may assume that the zero fuel injection rate/fuel cut-off signal is not reliable, and start padding the signal with lower positive quantiles of the same distribution. For any internal combustion engine, the normal or median of probability distribution of the fuel injection rates shifts higher as the engine ages. In other words, more fuel is required to do the same amount of work as the powertrain and transmission assemblies wear out over time.

In subprocess 720, algorithm 500 determines whether or not there is bias, based on the analysis in subprocess 710. If there is bias (i.e., "Yes" in subprocess 720), algorithm 500 proceeds to subprocess 730 before proceeding to subprocess 740. Otherwise, if there is no bias (i.e., "No" in subprocess 720), algorithm 500 proceeds to subprocess 740 without passing through subprocess 630.

In subprocess 730, a zero-value filter is executed. In an embodiment, algorithm 500 tracks a joint probability distribution of engine load and fuel injection rate for the vehicle being monitored. This probability distribution is used to track lower quantiles of fuel injection rate at minimal engine loads. A customized zero-value filter may be executed to pad the marginal, lower quantiles of values of fuel injection rate in the probability distribution, based on the density of elements at marginal engine loads. As discussed above, once algorithm 500 has ascertained that the fuel cut-off signal is not reliable in subprocesses 710-720 (i.e., a bias exists towards the lower tail of the probability distribution of fuel injection rates), zero fuel injection rates, during coasting with minimal engine load and marginal accelerator pedal depression, are padded with lower positive quantiles of the fuel injection rates in the probability distribution.

In subprocess 740, the fuel injection rates are integrated over time to derive the fuel consumption series. A jitter time series may be mapped to the fuel injection rates using statefully derived estimates of signal sampling frequency. In addition, fuel efficiency estimates, which evolve over accumulated fuel consumption series, may be used in conjunction with odometer values and/or geospatial data, representing distance traveled, to integrate the fuel injection rates across the jitter. For example, instantaneous fuel injection rates may be sampled (e.g., in L/H) from the engine management system. These rates can be integrated over time to derive liters of fuel injected for a given time duration. A jitter in the time series implies an unavailability of the fuel injection rate signal for a given period (e.g., due to losses in transmission from TCU 340). Fuel consumption between odometer values, interspersed with signal outage, may be calculated by coupling fuel efficiency estimates in the stored state for the vehicle with the distance traveled during the outage (e.g., dividing the distance traveled during the outage by the relevant fuel efficiency estimate).

Initially, a priori estimates of fuel efficiency may be used. However, subsequently, a trendline of the fuel consumption series and the calculated distance for the fuel consumption series may be used to track fuel efficiency for the vehicle as it evolves over time. For example, dividing distance by fuel consumption, for a given scenario (e.g., a set of one or more driving conditions), will provide a current value of fuel efficiency for that scenario. Thus, a function may be derived that estimates fuel efficiency for a given scenario.

2.3. Fuel Level Series

Figure 8:
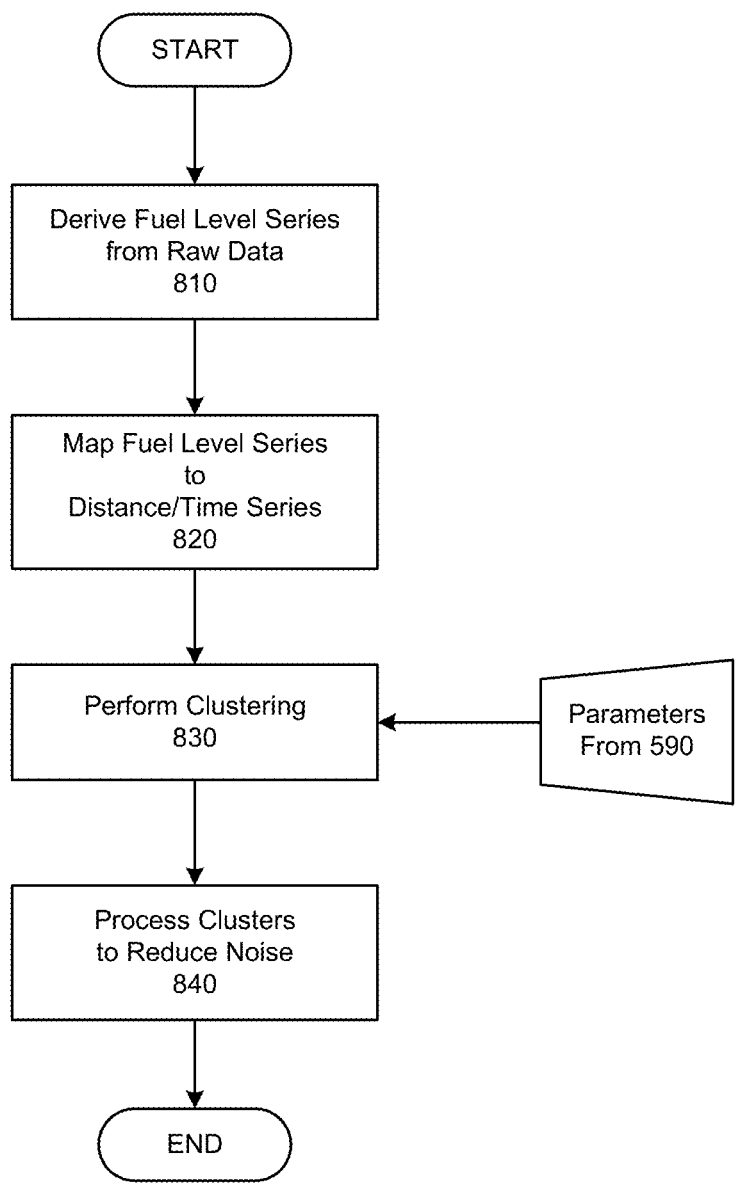
FIG. 8 illustrates an example subprocess for generating a fuel level series, according to an embodiment.

A fuel level series is curated in parallel to the fuel consumption series to handle sloshing and to cluster data into clusters across refill and pilferage events. FIG. 8 illustrates an example of subprocess 530 for generating the fuel level series, according to an embodiment. Subprocess 530 may utilize fuel level data from raw data 510 (e.g., acquired from the engine management system). The fuel level data may comprise measures of the percentage of fuel tank capacity at various intervals. In addition, subprocess 530 may utilize the volume or capacity of the fuel tank in the vehicle (e.g., obtained from vehicle metadata).

In subprocess 810, the fuel level series is derived from the fuel level data in raw data 510. For example, the fuel level data in raw data 510 may be combined with the volume of the fuel tank in the vehicle metadata to obtain a fuel level series in terms of volume (e.g., in liters). Specifically, the volume represented by a given fuel level percentage value may be determined by multiplying the percentage value by the volume of the fuel tank.

In subprocess 820, this fuel level series is mapped over a distance/time series to obtain fuel level over unit distance and/or unit time. Time may be measured as engine hours (i.e., a time span that only includes time periods during which the engine is running and excludes time periods during which the engine is off).

In subprocess 830, clustering is performed on the fuel level series. As discussed with respect to subprocess 590, parameters may be determined for use in the clustering algorithm and evolve over time with new raw data 510. One or more sliding windows, as dynamically configured by the parameters determined in subprocess 590, may be used to dampen sloshing-induced dispersions in the fuel level series and/or automatically configure clustering parameters. The sliding window may be configured using the volume of the fuel tank and signal frequency over distance and time, and/or other vehicle characteristics. In addition, convergence parameters over distance, in combination with stateful measures of sampling frequency, may be used to derive the minimum number of points required for density-based clustering. In an embodiment, the minimum number of points for a cluster is calculated as:

$$\text{Minimum Number of Points} = k * \text{sampling frequency} * \text{distance scale}$$

wherein k is a constant sparseness factor, sampling frequency is the number of samples acquired per unit of distance (e.g., $km^{-1}$), and distance scale is the distance spanned by the fuel level series (e.g., km).

Prior to performing the clustering, staging may be performed using a configuration determined by one or more of the data derived from raw data 510 and/or vehicle metadata (e.g., volume of fuel tank, vehicle applications, such as whether the vehicle is an on-highway or off-highway vehicle, heuristic estimates of fuel efficiency, etc.), and/or the parameters determined in subprocess 590 (e.g., minimum number of points). For example, in an embodiment, the default configuration is determined using the capacity of the fuel tank, a priori estimates of fuel efficiency for the vehicle, and assumptions about the amplitude of sloshing based on the vehicle type and/or application. It should be understood that the configuration may change over time, for example, as the estimates of fuel efficiency and assumptions about sloshing evolve. In other words, the configuration for clustering is routinely and automatically updated over time based on trends in fuel efficiency that are learned over time and/or the fuel level variance distribution aggregated over contextual distance. In this manner, the clustering algorithm or model utilizes machine-learning to train itself to cluster across refill and pilferage events, while ignoring noise (e.g., dispersions related to sloshing).

FIGS. 9A and 9B illustrate an example of how clustering parameters are updated (e.g., in subprocess 590), according to an embodiment. Specifically, FIG. 9A illustrates the initial clustering parameters, whereas FIG. 9B illustrates the clustering parameters after four refill cycles and approximately 3,250 kilometers. In this example, a tractor trailer with a 415 L fuel tank starts with a default configuration of 20.75 L for the fuel level scale (i.e., the semi-minor axis), representing 5% of the fuel tank capacity. With a rated gross vehicle weight of 55 tons and 7.2 L diesel engine, the expected fuel economy of the tractor trailer is 2.75 kilometers per liter. The distance scale (i.e., the semi-major axis) converges to 17.5 kilometers, which is calculated as the fuel level scale multiplied by the expected fuel economy with an initial overfitting factor of ⅙. Assuming an average speed of 35 kilometers per hour, a collection frequency by TCU 340 of 1/60 seconds, and a sparseness factor of k=0.6, the minimum number of points for a cluster is configured as 36. The updated configuration of clustering parameters after four refill cycles and 3,250 kilometers is a fuel level scale of 19.67 L, distance scale of 10.55 kilometers, and minimum number of points of 22.03.

Next, the fuel level series, as mapped to the distance/time series in subprocess 720, is passed through unsupervised density-based clustering to generate ordinal clusters or zones with gradients that represent fuel efficiency. A sliding window method may be used to make the process of clustering on the fuel level-distance plane adaptive with continuous learning. The clusters will be separated by dispersion that is generated due to refill and pilferage events. Dispersion characteristics and their convergence on the distance scale, as determined in subprocess 590, may be used to define the proximity of points during the clustering.

In an embodiment, clustering is executed on the fuel level-distance plane. The clustering algorithm takes two primary inputs: the distance between points within a cluster, commonly referred to as Epsilon (EPS); and the minimum number of points in a cluster. EPS is defined along the axes of an ellipse, with the distance scale being the major axis of the ellipse, and the fuel level scale being the minor axis of the ellipse. All points within the bounds of the ellipse are grouped within the cluster. A valid cluster must contain at least the minimum number of points. Points within the intersection between two clusters along the distance axis can be nullified. As EPS and the minimum number of points are updated (e.g., as new data is collected for incremental distances or engine hours), the clusters will begin to separate across refill and pilferage events and group fluctuations, related to vehicle dynamics (e.g., sloshing), together.

In subprocess 840, every cluster, output by the clustering algorithm, may be processed using non-parametric regression to eliminate sloshing-induced dispersions, while retaining local trends in the fuel level series as a function of dynamically changing fuel efficiency (i.e., a function of fuel level vs. distance traversed) and capturing variations in vehicle orientation due to terrain. For example, a regression model may be used that fits local lines of best fit within the cluster. The extent of localization may be defined by a span parameter. The locally weighted polynomials are able to fit varying gradients, in the fuel level-distance plane, that are induced by changes in fuel economy over time and vehicle orientation, while reducing sloshing-induced fluctuations.

Figure 10:
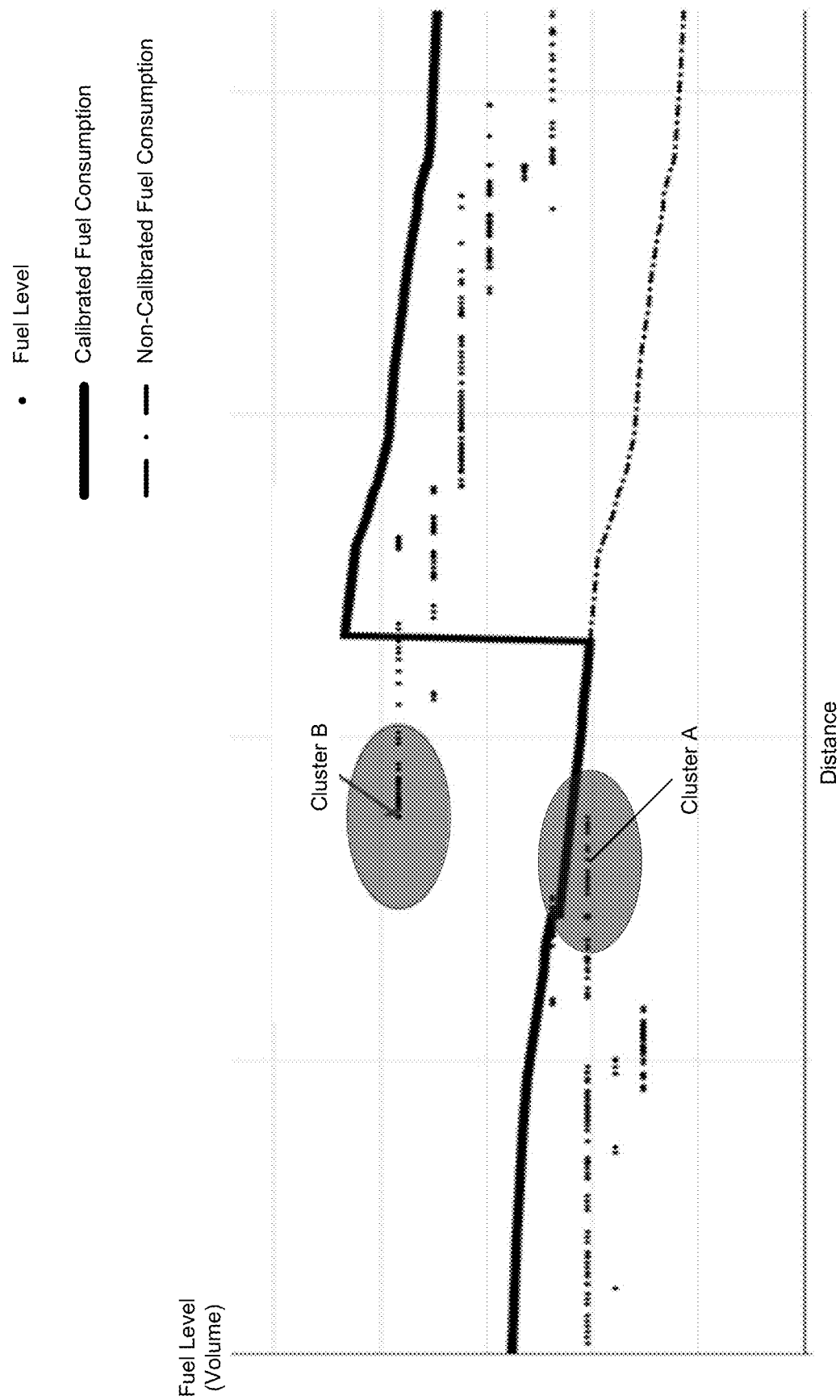
FIG. 10 illustrates an example clustering, according to an embodiment, according to an embodiment.

FIG. 10 illustrates an example clustering, according to an embodiment. FIG. 10 highlights two clusters: Cluster A and Cluster B. Each cluster has an area under the ellipse and eccentricity that may be defined as a function of fuel level dispersion (fuel level scale or "levelScale"), distance convergence (i.e., distance scale or "distanceScale"), and minimum support (i.e., minimum number of points or "minPoints"):

$$\text{Bin}_i = \{\text{area}, \text{eccentricity}\}_i = f(\text{levelScale}_i, \text{distanceScale}_i, \text{minPoints}_i)$$

As an example, the area under the ellipse and the eccentricity of the ellipse may be defined as:

$$\text{area}_i = \pi * \frac{\text{levelScale}_i}{2} * \frac{\text{distanceScale}_i}{2}$$

$$\text{eccentricity}_i = \frac{\sqrt{\left(\frac{\text{distanceScale}_i}{2}\right)^2 - \left(\frac{\text{levelScale}_i}{2}\right)^2}}{\text{distanceScale}_i}$$

2.4. Estimator Map

Figure 11:
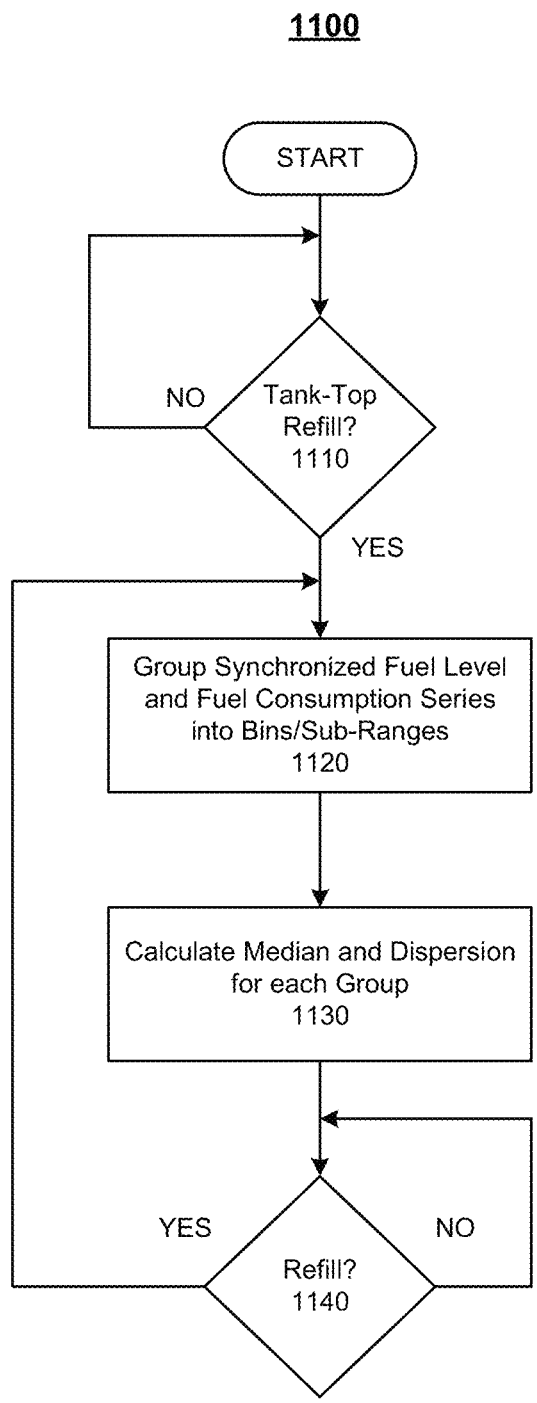
FIG. 11 illustrates a process for updating an estimator map, according to an embodiment.

FIG. 11 illustrates a process 1100 for updating the estimator map, according to an embodiment. Essentially, the estimator map may be created the first time that there is a tank-top refill event, and then updated each time there is a subsequent refill event. Specifically, subprocesses 1120-1140 do not execute until a tank-top refill is detected (i.e., "Yes" in subprocess 1110), and thereafter subprocesses 1120 and 1130 execute each time there is any refill (i.e., "Yes" in subprocess 1140), whether tank-top or partial. The application may detect a tank-top refill based on an inflection that suddenly increases the fuel level to or near the top-most level (i.e., maximum discrete fuel level that is detectable by the sensor). For example, a tank-top refill may be detected when a cluster tail, that appears subsequent to an upward inflection representing a refill event, equals or exceeds a threshold (e.g., 95%) of the fuel tank's capacity on the fuel level scale. A partial refill may be detected based on an inflection that suddenly increases the fuel level, but not to a value that exceeds this threshold. A tank-top refill is used to ensure stateful synchronization between the fuel level series and the fuel consumption series. A fuel level value that is read, after a fuel nozzle cuts off during a refill event, is considered a definitive estimate of the volume of the fuel tank.

In subprocess 1120 the fuel level series and the fuel consumption series, as synchronized in subprocess 580, are grouped into corresponding bins, to create or update the estimator map. Bin size may be derived based on the size of the fuel tank and the desired signal resolution. For example, assuming a fuel tank size of 415 L with a reed switch sensor having a resolution of 16-21 liters, for a target resolution of +/−8-9 liters, the bin size may be set to 2% of fuel tank capacity. The fuel level bins would be ordered as [0, 2), [2, 4), [4, 6) . . . [96, 98), [98, 100], where each number pair represents an interval of the fuel tank capacity.

In subprocess 1130, the median and dispersion are calculated for each grouping. The median of each sub-range in the fuel consumption series represents the projected or estimated fuel level for the corresponding bin in the fuel level series. The dispersion of each bin represents the entropy of the bin. In an embodiment, when the estimator map is referenced to obtain representative fuel consumption values for a raw fuel level, bins with higher entropy may be ignored.

In subprocess 1140, if a new refill event is detected (i.e., "Yes" in subprocess 1140), the estimator map is updated by another iteration of subprocesses 1120 and 1130. In this manner, a bin-wise estimator map may be updated for a fuel level and fuel consumption series generated after each refill.

3. Example Use Cases

Advantageously, the disclosed application implements and maintains a model for sub-resolution measurement of fuel levels in an apparatus (e.g., vehicle), which evolves with the apparatus to automatically account for measurement distortions caused by tank deformation, sensor degradation, and the like. In addition, the model is able to measure the fuel volumes of top and bottom dead-bands in the fuel tank. Thus, the disclosed application is able to provide more accurate measurements of fuel level for vehicles (e.g., automobiles, locomotives, construction or mining vehicles, etc.) and other apparatuses (e.g., generators). The disclosed application could also be applied to fluids other than fuel, such as the diesel exhaust fluid in an exhaust aftertreatment system (EAS).

In turn, the more accurate measurement of fuel level can be used to derive highly reliable distance-to-empty estimates (i.e., the total distance that can be traveled with the current fuel level). In particular, the volume of fuel represented by the fuel level, as estimated by the model, can be multiplied by a vehicle's fuel economy to produce an accurate distance-to-empty measurement.

As discussed elsewhere herein, inflections, such as refill and pilferage events, can be distinguished from other dispersions. For example, a pilferage event may be detected based on a downward deviation that exceeds a threshold representing a maximum sloshing-induced dispersion. In an embodiment, the disclosed application detects and reports such pilferage events.

Fuel pilferage from commercial vehicles is a widespread practice that plagues multiple industries, including transportation, construction, and mining. Fuel pilferage can be attributed to two common practices. Firstly, fuel may be directly siphoned from the fuel tank or other nodes in the fuel system. This is referred to as fuel theft. Secondly, the vehicle operator may over-quote the fuel volume for reimbursement of a refill event. In other words, the amount dispensed is less than the amount billed, and the difference is embezzled by the vehicle operator and the fuel station attendant. This is referred to as underfilling. Controlling fuel pilferage can result in a 5-15% improvement in fuel economy in the transportation industry, and a 20-30% improvement in fuel economy in the mining, construction, and power-generation industries. This is significant, considering that fuel costs can account for at least 40% of the operating costs of commercial vehicle fleets.

Figure 12:
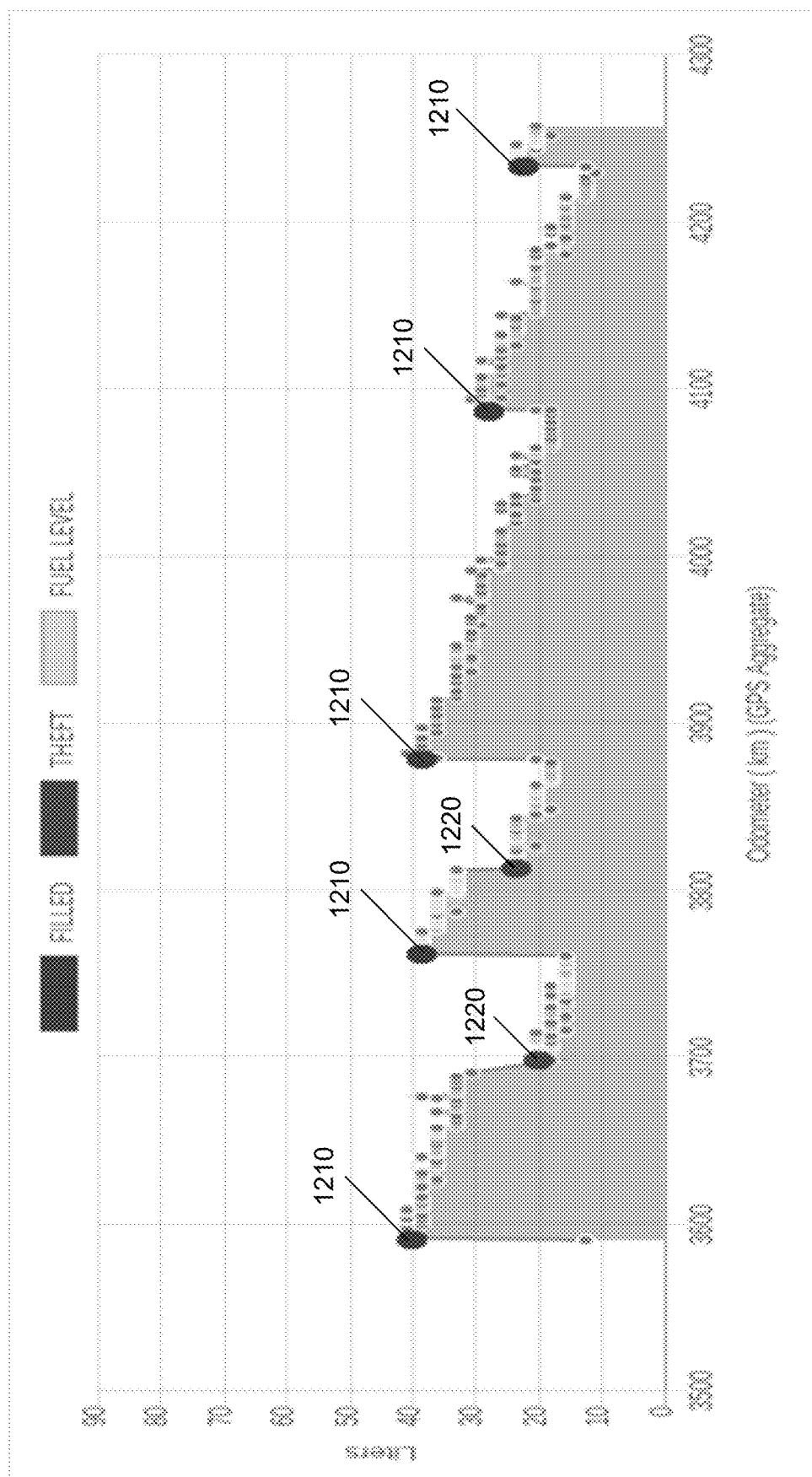
FIG. 12 illustrates an example of a graph of fuel levels, according to an embodiment.

The disclosed application may accurately measure the fuel amount that is dispensed during a refill event, and alert a user if a pilferage event is detected. For example, the graphical user interface of the application may comprise a line graph of fuel level over distance or time. Downward inflections in the graph that are sufficient in magnitude to represent a pilferage event to a threshold degree of confidence may be marked (e.g., by an icon and/or other distinguishing characteristic). FIG. 12 illustrates an example of a graph of fuel levels, including representations 1210 of refill events (e.g., represented as a blue, purple, or other non-red dot) and representations 1220 of pilferage events (e.g., represented as a red dot), according to an embodiment. A user may click on the representation of the pilferage event to obtain information about the pilferage event, including, without limitation, a time that the event occurred, a location at which the event occurred (e.g., based on collected geospatial data), an amount of fuel that was pilfered, and/or the like. Alternatively or additionally, the application may initiate an alert, such as in-app alert, email message, text message (e.g., Short Message Service (SMS) message, Multimedia Messaging Service (MMS) message, etc.), and/or the like, to the user whenever a pilferage event is detected. The alert may comprise the information about the pilferage event and/or a hyperlink to a screen of the graphical user interface that comprises the information about the pilferage event. Notably, the application is able to perform this function because of its ability to measure fuel volume between the discrete fuel levels of conventional sensor systems, and without the installation of any additional or aftermarket equipment in the apparatus being monitored.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive data comprising discrete fuel levels in a fuel tank supplying an internal combustion engine, and fuel injection rates for the internal combustion engine;
   integrate the fuel injection rates over a traversed distance to produce a fuel consumption series;
   cluster the discrete fuel levels into clusters over the traversed distance to produce a fuel level series;
   synchronize the fuel consumption series and the fuel level series into a model by mapping sub-ranges of the fuel consumption series to corresponding bins in the fuel level series; and
   generate sub-resolution measurements of fuel levels, between the discrete fuel levels, based on the model.

2. The method of claim 1, further comprising using the at least one hardware processor to:
   calculate dispersion characteristics in the fuel level series according to one or more clustering parameters; and
   detect one or more refill events based on the dispersion characteristics.

3. The method of claim 2, further comprising using the at least one hardware processor to update the one or more clustering parameters over time.

4. The method of claim 3, wherein the one or more clustering parameters comprise a fuel level scale representing a semi-minor axis of an ellipse used to cluster fuel level values, a distance scale representing a semi-major axis of the ellipse, and a minimum number of points.

5. The method of claim 2, further comprising using the at least one hardware processor to detect one or more pilferage events based on the dispersion characteristics.

6. The method of claim 3, further comprising using the at least one hardware processor to, in response to detecting a pilferage event, generate an alert.

7. The method of claim 3, wherein the dispersion characteristics are calculated using a sliding window, and wherein a size of the sliding window is adjusted over time as new data is received.

8. The method of claim 2, wherein detecting one or more refill events comprises differentiating between a tank-top refill event and a partial refill event.

9. The method of claim 8, further comprising using the at least one hardware processor to, in response to detecting a first tank-top refill event, generate an estimator map that estimates fuel level as a function of the fuel consumption series.

10. The method of claim 9, wherein synchronizing the fuel consumption series and the fuel level series comprises:
when the estimator map has not yet been generated, calculating an offset based on fuel levels in the received data;
when the estimator map has been generated, calculating the offset based on the estimator map; and
aligning the sub-ranges of the fuel consumption series with the bins in the fuel level series based on the offset.

11. The method of claim 9, further comprising using the at least one hardware processor to, in response to detecting each refill event after the first tank-top refill event, update the estimator map.

12. The method of claim 1, further comprising using the at least one hardware processor to, before integrating the fuel injection rates over the traversed distance to produce the fuel consumption series:
analyze a probability distribution of the fuel injection rates to determine whether or not bias exists at one or more extremities of the fuel injection rates; and,
when determining that bias exists at an extremity of the fuel injection rates, apply a filter to the fuel injection rates at the extremity.

13. The method of claim 1, wherein the clustering comprises unsupervised density-based clustering.

14. The method of claim 1, wherein clustering the discrete fuel levels into clusters over the traversed distance to produce the fuel level series comprises processing each cluster using non-parametric regression to eliminate sloshing-induced dispersions.

15. The method of claim 1, wherein the clustering utilizes a plurality of parameters that are updated over time as new data is received, and wherein the plurality of parameters comprises a level scale representing a first axis of an ellipse used for clustering in a function of fuel level to distance or engine hours, a distance scale representing a second axis of the ellipse, and a minimum number of points for a cluster.

16. The method of claim 1, wherein the received data further comprises two or more odometer values, and wherein the method further comprises using the at least one hardware processor to calculate the traversed distance based on the two or more odometer values.

17. The method of claim 1, wherein the received data further comprises two or more geospatial coordinates, and wherein the method further comprises using the at least one hardware processor to calculate the traversed distance based on the two or more geospatial coordinates.

18. The method of claim 1, wherein the data is received from a telematics control unit, installed in a vehicle comprising the fuel tank and the internal combustion engine, over at least one network.

19. The method of claim 18, wherein the at least one network comprises a wireless network.

20. The method of claim 19, wherein the data is received in real time.

21. A system comprising:
a fuel tank supplying an internal combustion engine;
at least one hardware processor; and
one or more software modules that are configured to, when executed by the at least one hardware processor,
receive data comprising discrete fuel levels in the fuel tank, and fuel injection rates for the internal combustion engine,
integrate the fuel injection rates over a traversed distance to produce a fuel consumption series,
cluster the discrete fuel levels into clusters over the traversed distance to produce a fuel level series,
synchronize the fuel consumption series and the fuel level series into a model by mapping sub-ranges of the fuel consumption series to corresponding bins in the fuel level series, and
generate sub-resolution measurements of fuel levels, between the discrete fuel levels, based on the model.

22. A non-transitory computer-readable medium having instructions stored therein, wherein the instructions, when executed by a processor, cause the processor to:
receive data comprising discrete fuel levels in a fuel tank supplying an internal combustion engine, and fuel injection rates for the internal combustion engine;
integrate the fuel injection rates over a traversed distance to produce a fuel consumption series;
cluster the discrete fuel levels into clusters over the traversed distance to produce a fuel level series;
synchronize the fuel consumption series and the fuel level series into a model by mapping sub-ranges of the fuel consumption series to corresponding bins in the fuel level series; and
generate sub-resolution measurements of fuel levels, between the discrete fuel levels, based on the model.

* * * * *